United States Patent [19]

Fischer

[11] Patent Number: 5,331,634
[45] Date of Patent: Jul. 19, 1994

[54] TECHNIQUE FOR BRIDGING LOCAL AREA NETWORKS HAVING NON-UNIQUE NODE ADDRESSES

[75] Inventor: Michael A. Fischer, San Antonio, Tex.

[73] Assignee: Digital Ocean, Inc., Overland Park, Kans.

[21] Appl. No.: 11,361

[22] Filed: Jan. 29, 1993

[51] Int. Cl.5 .............................................. H04J 3/02
[52] U.S. Cl. .................... 370/85.130; 370/941
[58] Field of Search ................ 370/94.1, 94.2, 85.13, 370/85.14, 60, 60.1, 85.1; 340/825.52

[56] References Cited

U.S. PATENT DOCUMENTS

| | | | |
|---|---|---|---|
| 4,689,786 | 8/1987 | Sidhu et al. | 370/94.1 |
| 4,975,906 | 12/1990 | Takiyashu et al. | 370/85.13 |
| 5,166,931 | 12/1992 | Riddle | 370/94.1 |
| 5,218,603 | 6/1993 | Watanabe | 370/85.13 |
| 5,220,564 | 6/1993 | Tuch et al. | 370/94.1 |

OTHER PUBLICATIONS

Patent app., SN 011,415 for Medium Access Control Protocol for Wireless Network.
Chs. 1, 4 & 5, Inside Apple Tack, 2d Ed., by Apple Computer Inc. 1990.
AS-100 Spread Spectrum ASIC, Signal Tech. Inc., 1991.
CSL-100 MOD/DEMOD ASIC, Signal Tech Inc., 1991.
Model 200 RF Modem, Signal Tech. Inc. Nov. 1991.
Pp. 73–84, Data Link Control and Communication Channels. Data Network by Gallager et al. 1987.

Primary Examiner—Douglas W. Olms
Assistant Examiner—Chau T. Nguyen
Attorney, Agent, or Firm—John R. Ley

[57] ABSTRACT

A bridging apparatus provides the capability of transparently and unambiguously communicating LAN packets between two separate LAN segments which have nodes with duplicate IDs. A communicator connected to each LAN segment includes a controller which aliases the source identification (SID) of remotely originated or sourced LAN packets with an unused ID which is an alias (AID) before sending the LAN packet with the AID as its SID on the local LAN segment. The reverse occurs in response to locally sourced LAN packets containing the AID as the DID. The ID of the remote node which correlates to the AID is substituted as the DID before the LAN packet is transmitted to the remote LAN segment. By aliasing in this manner LAN packets are communicated by use of the AIDs between the nodes having the duplicate IDs on the two LAN segments without changing the LAN protocol. Each communicator preferably includes a transmitter and receiver by which to communicate bridge packets between communicators. The LAN packets are encapsulated in the bridge packets. Unique communicator source and destination identifications are included in each bridge packet to form a tuple which uniquely identifies each node in the Group without regard to the duplicate IDs on the separate LAN segments.

38 Claims, 7 Drawing Sheets

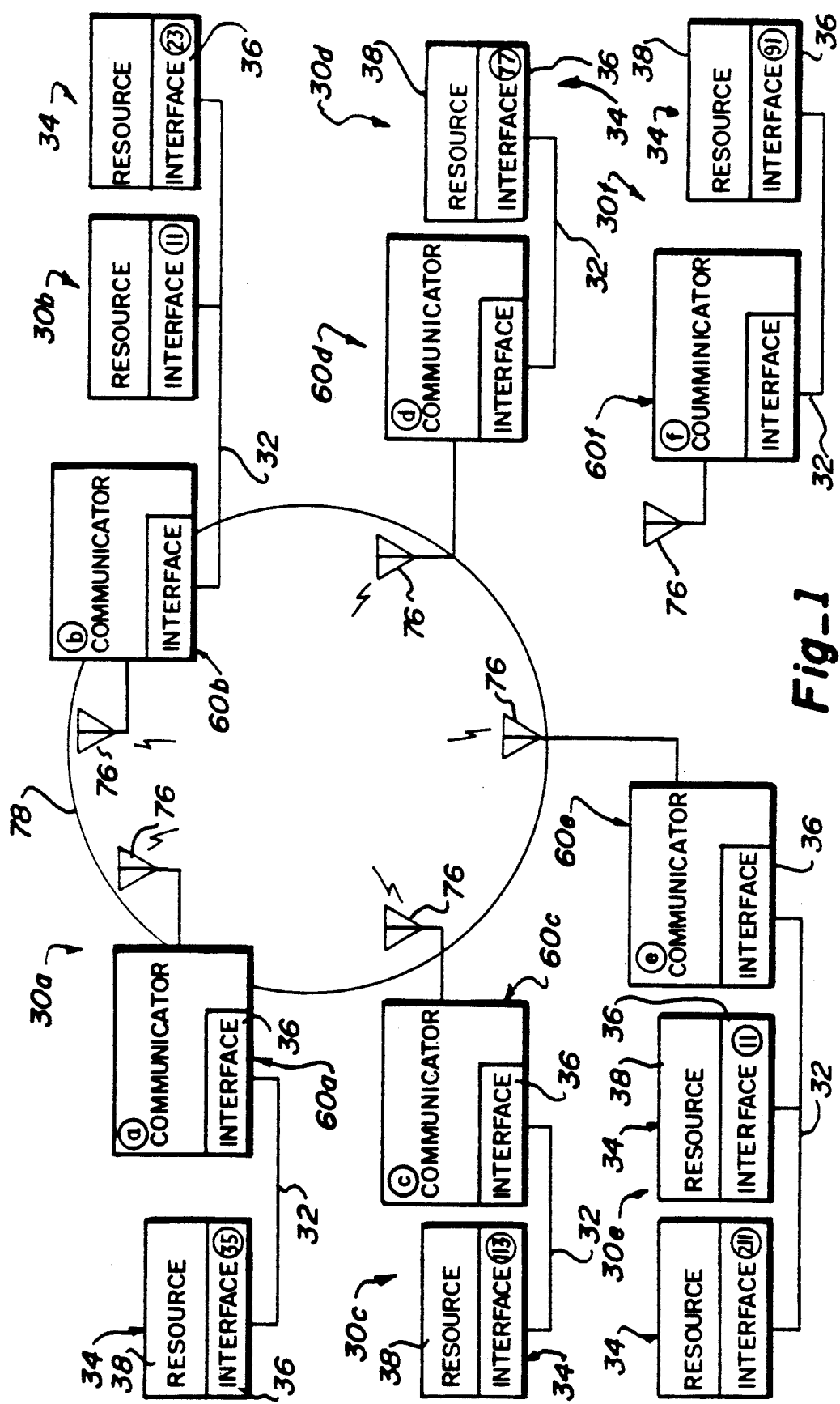
Fig_1

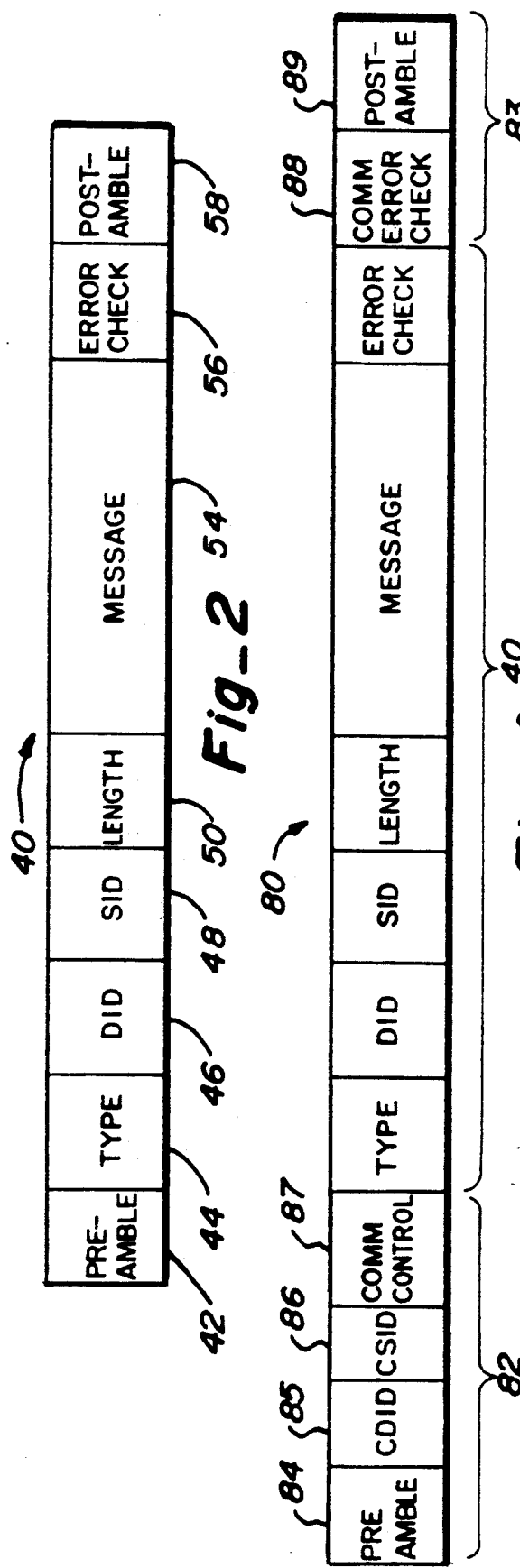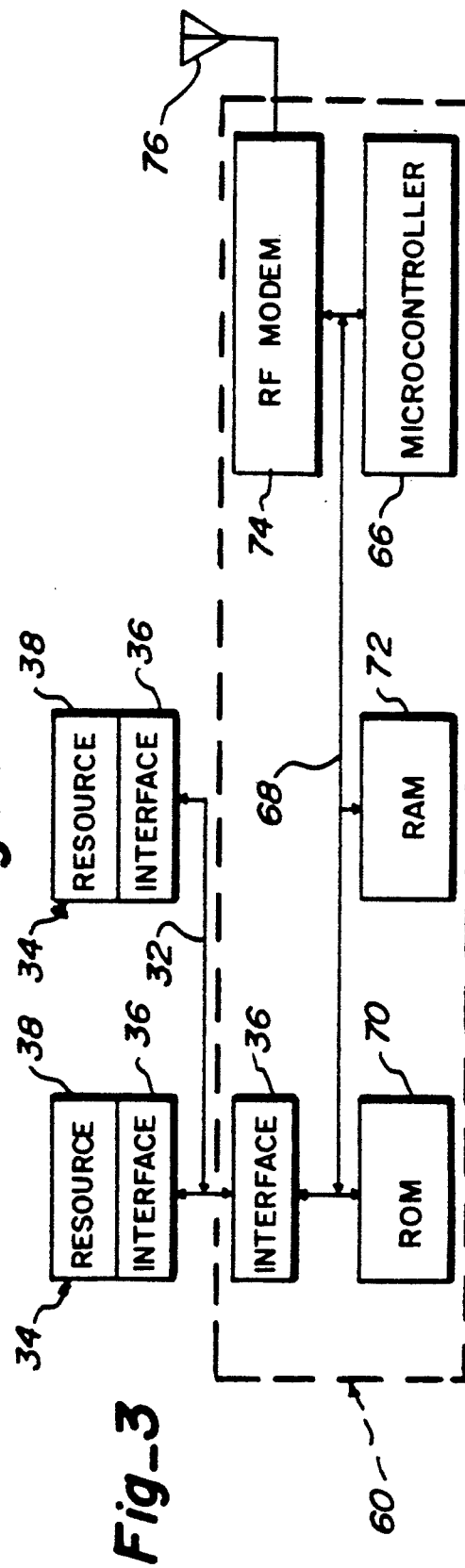

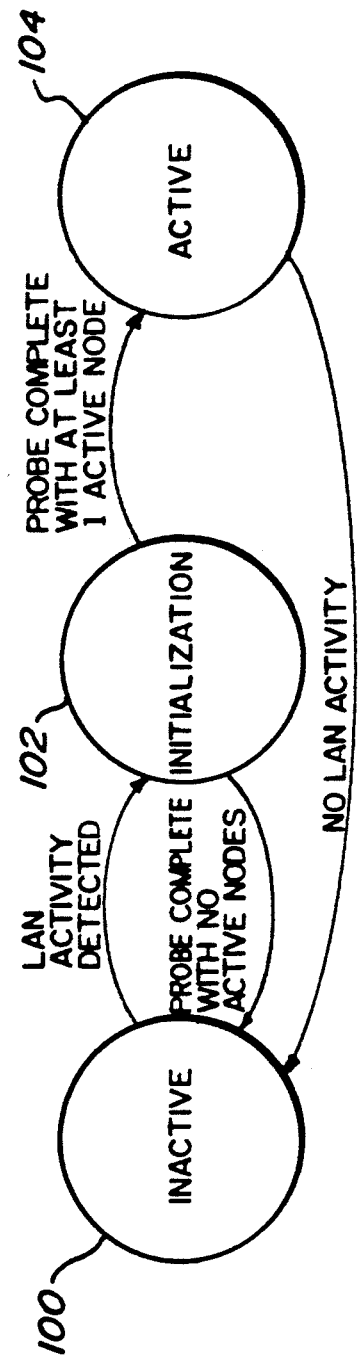
| ADDRESS ~92 | ADDRESS STATE ~94 | ALIAS ADDRESS ~96 | COMMUNICATOR ADDRESS ~98 | TIMESTAMP ~99 |
|---|---|---|---|---|
| 0 | | | | |
| 1 | | | | |
| 2 | | | | |
| 3 | | | | |
| 4 | | | | |
| 252 | | | | |
| 253 | | | | |
| 254 | | | | |
Fig_5 ~90
Fig_6

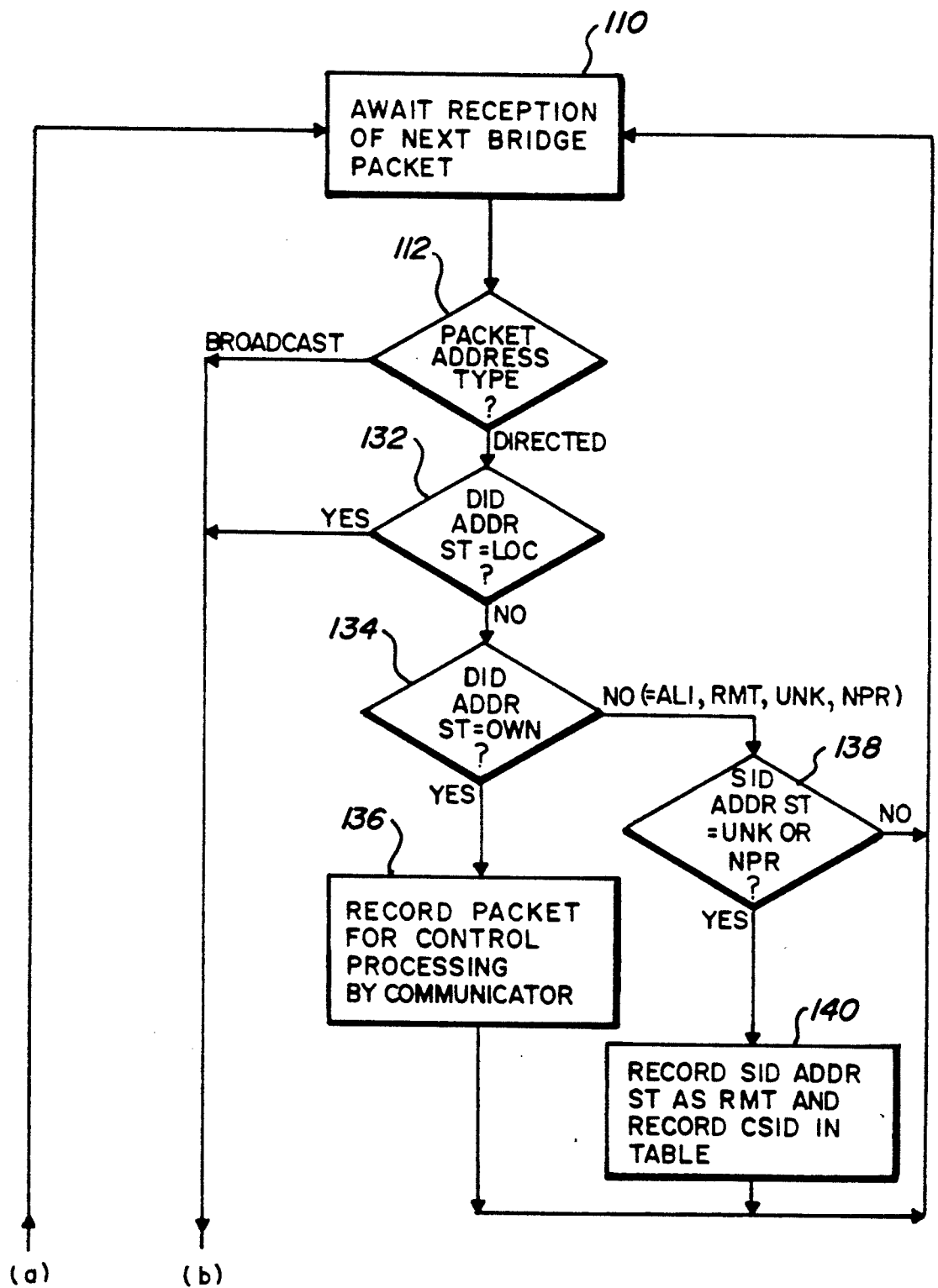
Fig_7a

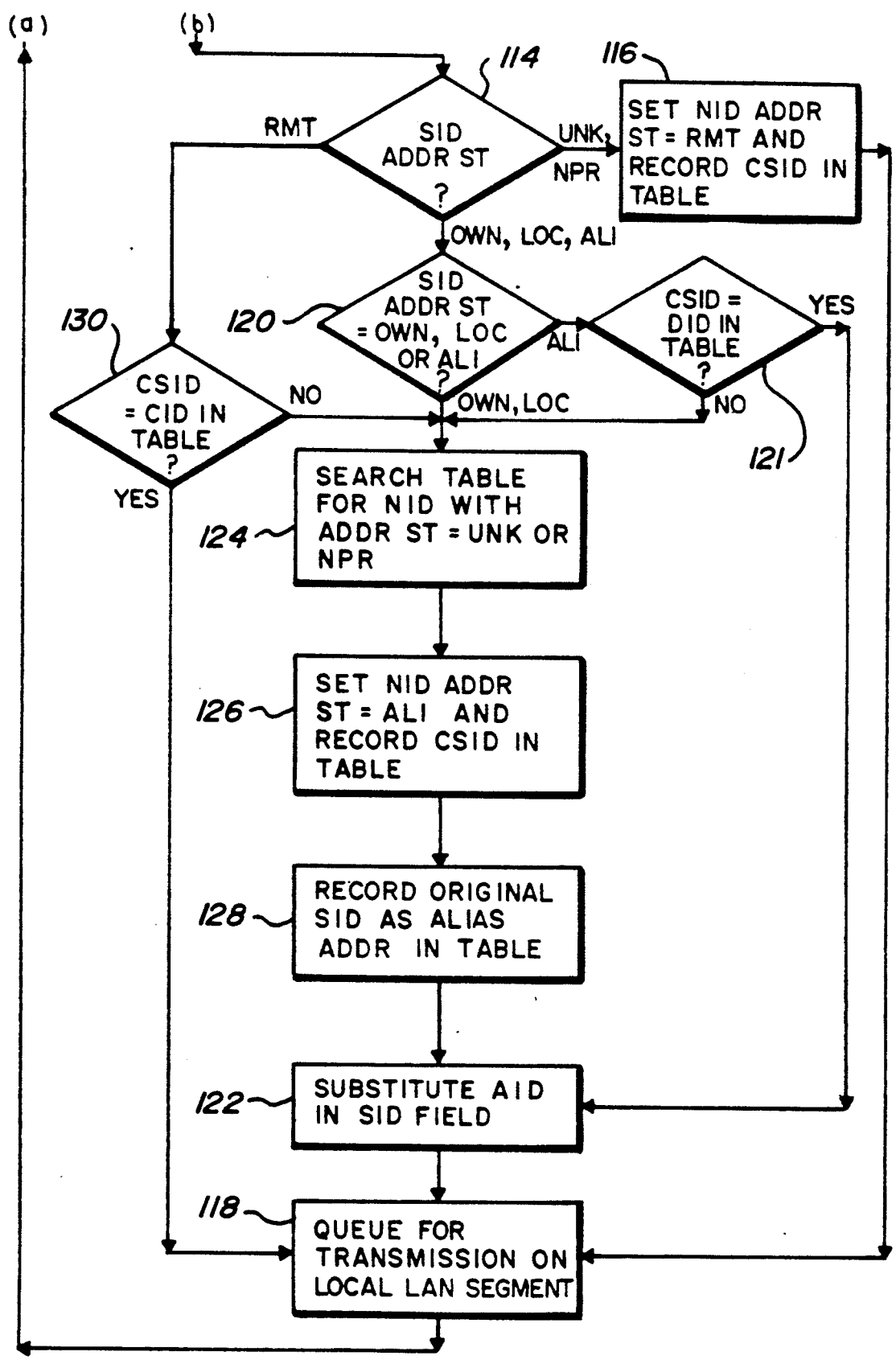
Fig_7b

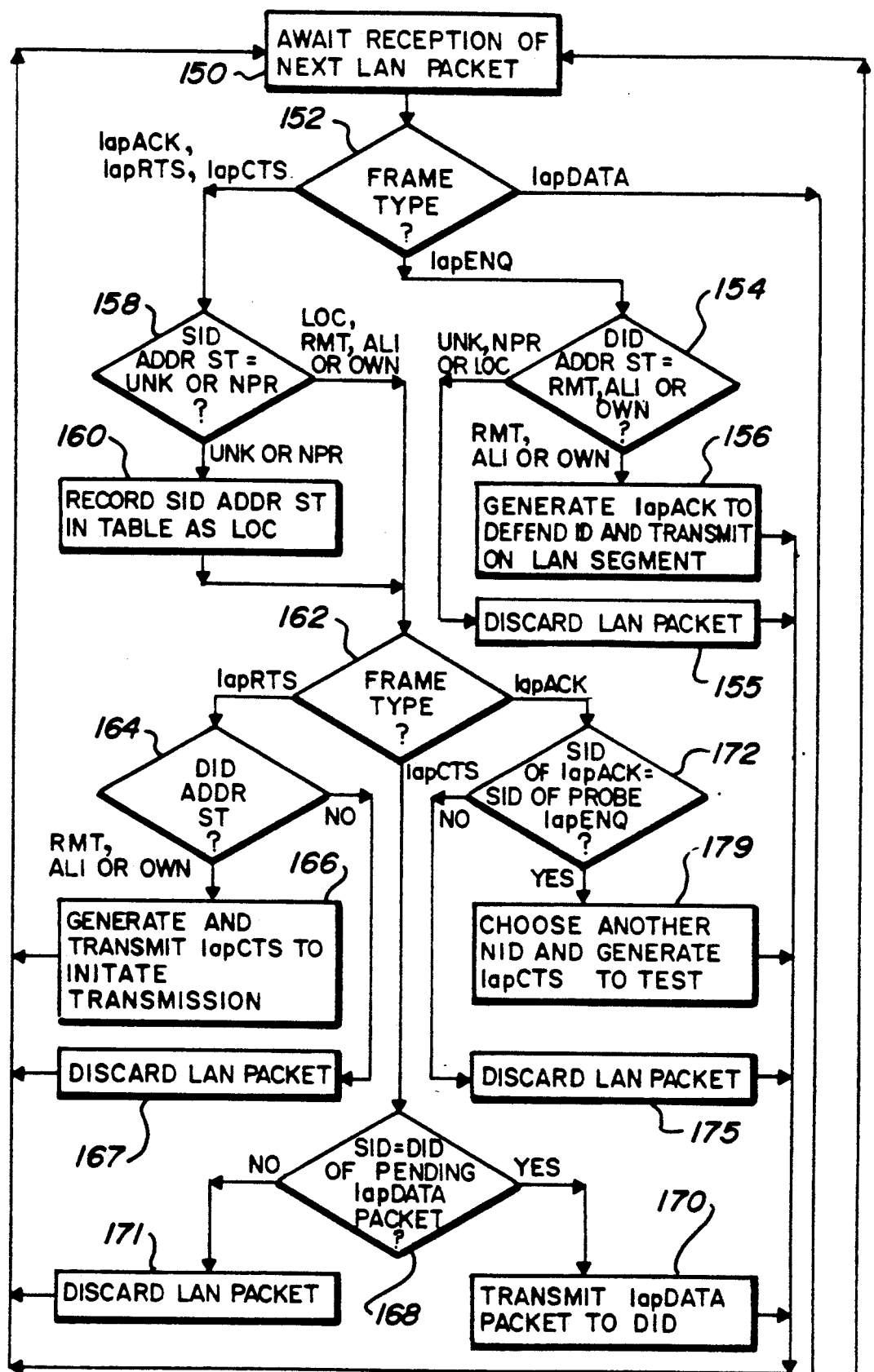
Fig_8a

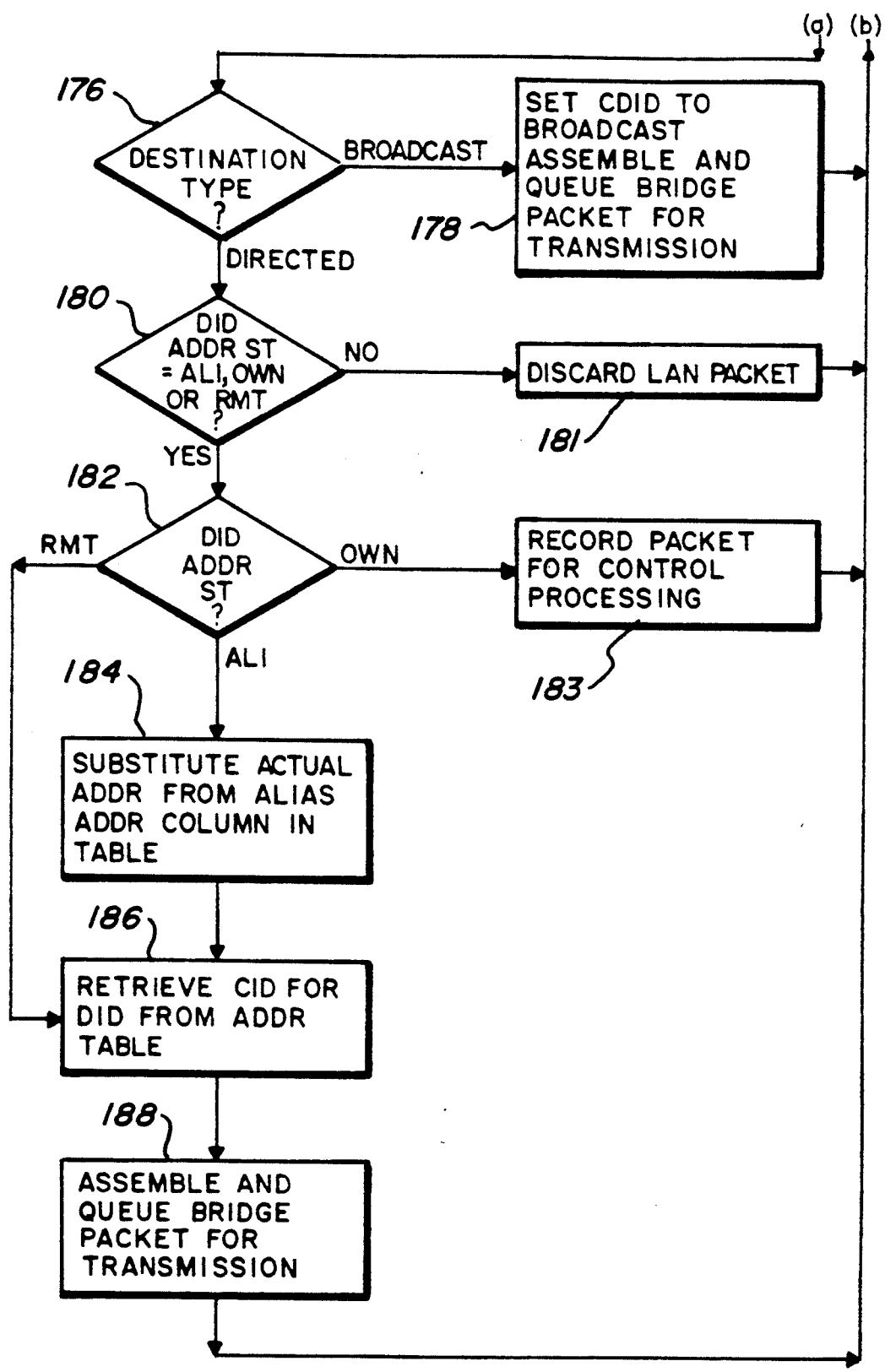
Fig_8b

TECHNIQUE FOR BRIDGING LOCAL AREA NETWORKS HAVING NON-UNIQUE NODE ADDRESSES

CROSS-REFERENCE TO RELATED APPLICATION

This invention relates to an invention for Medium Access Control Protocol for Wireless Network, Ser. No. 08/011,415, filed concurrently herewith, by the inventor hereof, and assigned to the assignee of the present Application. The disclosure contained in this related Application is incorporated herein by this reference.

FIELD OF THE INVENTION

This invention relates to a local area network (LAN), and more particularly to a technique for bridging multiple distinct LAN segments to permit transparent communication between the distinct LAN segments. Even more specifically, the present invention relates to bridging LAN segments in which each LAN segment may contain a node having a node address which is the same address as a node of another bridged LAN segment.

BACKGROUND OF THE INVENTION

A LAN is a well-known means of achieving communication between different resources, typically computer resources such as computers, work stations, printers and the like. The LAN itself includes a network interface connected to each resource and a physical communication medium connecting all of the interfaces. A particular interface and connected resource form a node. Each node has a unique address or identification (ID) which is established and set by the network interface. Because each node has a unique ID, it is therefore possible to route messages from one node to another node using the address of the originating or source node, sometimes referred to as a source identification (SID), and the address of the destination node, sometimes referred to as a destination identification (DID). Each network interface monitors the DID information in each message communicated by other nodes, and is able to selectively receive communications addressed appropriately. Network interfaces may maintain knowledge of all other functioning nodes on the communication medium, and with this knowledge, then are able to selectively address and receive the communications from the other nodes.

Typically, LAN communications between nodes are accomplished by sending and receiving an ordered group of bits known as a packet. Each packet is sent from a source node, and is received by one or more destination nodes. The IDs of the source and destination nodes are generally included within the packet in dedicated groups of bits at specific locations. The technique of communicating and controlling the composition of packets between the nodes is set by a network protocol. The network protocol may require, for example, that the destination node return a packet to a source node indicating that the destination node has successfully received the packet transmitted by the source node. As another example, prior to sending a packet containing data, the source node may send a packet to the destination node inquiring of the capability of the destination node to receive a data packet. In response, before the source node sends the data packet, the destination node may reply to the source node that it is or is not capable of receiving the data packet. These are examples of the types of packet transmission and reception which may occur in order to complete a single communication between two nodes on a LAN. Each network interface operates in accordance with the network protocol to assure the delivery and receipt of the packets and to achieve the overall functionality of the LAN.

A variety of different types of network protocols and node ID assignment techniques are used in present-day LANs.

A node identification (NID) in a LAN may be globally unique or locally unique. A globally unique NID is one which distinguishes a network interface from every other network interface which has ever been manufactured for a particular network. Ethernet, a registered trademark of Xerox Corp. (ANSI/IEEE 802.3), as well as other LANs standardized by IEEE Project 802 are examples of networks which use globally unique NIDs. A locally unique NID, on the other hand, is one which is unique on any individual instance of a network itself, but may be duplicative of an NID on an adjacent, unconnected and separate LAN. Locally unique NIDs are typically used when the network protocol permits only a limited number of nodes on the LAN. For example, a LAN known as ARCNET, a registered trademark of Datapoint Corporation, uses 8-bit, locally unique NIDs, thereby limiting the size of this network to no more than 255 distinct nodes. Thus, the locally-unique NIDs of any given LAN may have address values in a given pre-established range, such as from 1 to 255 (with zero reserved for broadcasts to all nodes). In general, locally-unique NID protocols require manual setting of the NID at the time the interface is connected to the resource or the automatic selection of the NID each time the resource activates its interface for connection into the network.

A LAN such as LocalTalk, a registered trademark of Apple Computer, Inc., uses a locally unique NID assignment technique which results in a dynamic, non-specific, random assignment of an NID at the time each particular node joins the network. This non-specific, dynamic assignment of NIDs occurs according to the rules defined by the LocalTalk network protocol. From a practicality standpoint, most dynamic NID assignment networks are limited in scope to a predetermined number of nodes, although theoretically, there is no limit to such dynamic node assignment if arbitrarily long times are acceptable to initialize network operation. In general terms, the dynamic NID assignment used by LocalTalk occurs as the network interface of the node joining the network sends groups of packets specifying a DID which has been chosen from a group of valid addresses until the packets fail to elicit a response, indicating (to an adequate probability for practical usage) that the specified DID is not currently active on the network. Under this condition, the network interface control function recognizes that the DID to which that group of packets were addressed is an available address, and the interface thereafter adopts that address as its SID and uses it for network communications for the remainder of this period of activity on the network. After each episode of inactivity, the network interface must repeat the above-described procedure to obtain an NID.

The interfaces of present-day LANs are connected to the communications medium in a variety of different configurations. For example, the node interconnection arrangement of the nodes to the communication medium may either be a ring topology or a bus topology. In a ring topology, each of the interfaces at the node is connected in a circular, serial manner, so that each node participates in passing the packet by receiving it from its neighbor and passing it on to its other neighbor. Examples of this type of ring connection topology is a LAN known as Token Ring, (ANSI/IEEE 802.5) and Fiber Distributed Data Interface ("FDDI") (ANSI X3T9.5). Alternatively, a bus topology involves the unitary logical connection of all network interfaces at a single logical point. In the bus topology, each packet communicated from the source node is received approximately simultaneously by all of the other nodes coupled to the bus. However, only the node(s) to which the communication is specifically directed actually accepts and processes the communication, while the other nodes disregard it. Examples of bus topology LANs are "LocalTalk", "ARCNET" and "Ethernet".

Because of the increasing popularity and demand that resources communicate and share information, LANs are becoming widely used. Although there are many varieties of LANs with varying characteristics, most of them function adequately for their intended purpose. A particular difficulty may occur, however, when one of the resources of one LAN wishes to communicate with a resource on a separate and distinct LAN. One technique for allowing communication between separate IANs or LAN segments is recognized and is known as network bridging. A network bridge may be employed to interconnect the communication medium of one LAN with a separate LAN to exchange communications between the two LANs.

In bridged LANs using globally-unique NIDs, the functionality of the network bridge is greatly simplified. The network bridge is simply able to repeat a packet from one LAN to another LAN without risk of confusing the communication associated with the packet, because the NIDs of both LANs are globally unique. The efficiency of bridging in LANs with globally unique NIDs can be further improved by "learning," in which the bridge observes packet traffic traversing the bridge in each direction to determine which NIDs are on which LAN, and subsequently repeats only those packets with DIDs that designate nodes on an alternate LAN. However, a particular problem arises when the communication occurs between bridged LANs on which the nodes have only locally unique NIDs, because of the possibility that there will be duplication of NID values on the different bridged LAN segments.

SUMMARY OF THE INVENTION

It is with respect to the problem of bridging LAN segments in which the NIDs on each segment may be duplicated, through dynamic assignment or otherwise, that the present invention is directed.

In accordance with the basic aspects of the present invention, a bridging apparatus provides the capability of transparently and unambiguously communicating LAN packets between two or more separate LAN segments which have nodes with duplicate NIDs. The bridging apparatus includes a LAN interface means adapted to be connected to each LAN segment and which communicates LAN packets to and from the nodes of the connected LAN segments using the LAN protocol which is used on the LAN segment. Although the LAN protocol prohibits nodes with the same ID from existing on each LAN segment, duplicate nodes may exist on the two LAN segments to be bridged in situations where the nodes do not have globally unique NIDs. The LAN protocol requires a SID and a DID to be included in each LAN packet to respectively identify the source node sending the LAN packet and the destination node intended to receive the LAN packet. The LAN packets with which the bridging apparatus interacts are either a locally destined packet sourced by a node on one LAN segment and destined for a node on the same LAN segment or a remotely destined LAN packet sourced by a node on one LAN segment and destined for a node on one of the other remote LAN segments.

The LAN interface means connected to each LAN segment are operatively interconnected and controlled, preferably by communicators associated with each LAN segment to send bridge packets between the communicators, to respond to a LAN packet which is received by the local LAN interface means and which is destined to a remote node by delivering the LAN packet to the remote LAN segment. An aliasing means responds to the SID of a LAN packet received from one LAN segment and determines if the SID is a duplicate of an ID of a node on the other LAN segment, and if so, substitutes for the SID an unused ID on the other LAN segment as an alias (AID) for the SID of the LAN packet before sending the LAN packet with the AID as the SID on the other LAN segment. By aliasing in this manner LAN packets are communicated by use of the AIDs between the nodes having duplicate IDs on the two LAN segments without changing the LAN protocol.

Each communicator preferably includes a transmitter and receiver means and a control means which controls the LAN interface means and the transmitter and receiver means to establish communication between the communicators and to deliver the LAN packets between the separate LAN segments. The control means determines information describing each ID active on each local LAN segment and information describing each ID present on each remote LAN segment, and utilizes this information to substitute the AID as the SID in those LAN packets obtained from one LAN segment and delivered to another LAN segment where the possibility of a duplicated ID exists. In LAN protocols where the IDs of each node are dynamically assigned on each LAN segment upon a node becoming active on the LAN segment by sending an inquiry to a DID node and thereafter appropriating the ID of the DID of the inquiry if a response to the inquiry is not received, the control means sends a response to inquiries from nodes on one LAN segment which have DIDs that are the same as IDs of active nodes on the other LAN segment. In addition the control means further operatively sends an inquiry to each node ID of each LAN segment with which it is associated to obtain information relating to the nodes which are active on each LAN segment. A time entry is also preferably associated with the information relating to each node ID indicating when the information relating to that node ID was obtained, and the information associated with the node ID is cancelled after the expiration of a predetermined time period following the time entry to allow new information to be collected and to detect whether new nodes are active on the LAN segments, either due to powering up or transferring their association to another communicator.

This technique is also applicable for bridging communications between a Group of a plurality of separate LAN segments in which nodes of at least two separate LAN segments have duplicate IDs. In this situation each communicator further includes a communicator interface means for transmitting and receiving bridge packets between the communicators associated with the separate LAN segments. The LAN packets are encapsulated in the bridge packets. Preferably the transmission and reception is wireless, such as by radio frequency signals. Each communicator interface means has a unique identification (CID) which identifies and distinguishes it from every other communicator interface means in the Group. The control means functions in response to the receipt from the LAN interface means of a locally sourced LAN packet destined for a remote node by encapsulating the locally sourced and remotely destined LAN packet into the bridge packet before sending the bridge packet to the other communicator. A communicator source identification (CSID) and a communicator destination identification (CDID) are included in each bridge packet to respectively identify the source communicator interface means transmitting the bridge packet and the destination communicator means intended to receive the bridge packet. The CDID of the communicator interface means associated with the LAN segment having the node to which the LAN packet is destined is determined from the information available to the control means. The control means of the recipient communicator responds to a bridge packet which has its CID as the CDID to extract the LAN packet from the received bridge packet and to send the extracted LAN packet to the local LAN segment having the node to which the extracted LAN packet is destined. The CDID of the bridge packet and the DID of the LAN packet form a "tuple" which uniquely identifies each node in the Group without regard to the duplicate IDs on the separate LAN segments.

The information describing the ID of each active node on the local LAN segment, describing the ID of each node present on each remote LAN segment, describing each CDID with which each present remote node ID is associated and correlating each AID with the ID of the remote present node with its associated CDID is maintained, and this information is used to substitute the AID as the SID in each LAN packet destined for a node on the local LAN segment with a duplicate ID. To obtain this information, an inquiry is sent by the communicator to each potential node ID of the local LAN segment to obtain at least some of the information relating to the nodes which are active on the local LAN segment. To prevent the appropriation of more duplicate IDs than necessary in the case of dynamically assigned node IDs, the control means sends a response on the local LAN segment to inquiries from local nodes seeking to appropriate IDs that are already known to be present on remote LAN segments.

By the present invention, it is therefore possible for nodes with duplicate IDs on separate LAN segments to unambiguously address each other. The unambiguous communication between communicators is established by the unique CIDs while the aliasing means obtains unambiguous communication between the nodes with duplicate IDs on the local LAN segments. This is accomplished without interference with, modification to, nor involvement by the preexisting LAN protocol, LAN interface and LAN software.

A more complete appreciation of the present invention and its scope can be obtained from understanding the accompanying drawings, which are briefly summarized below, the following detailed description of a presently preferred embodiment of the invention, and the appended claims.

BRIEF DESCRIPTION OF THE DRAWINGS

FIG. 1 is a block diagram of a plurality of LAN segments bridged together in accordance with the present invention.

FIG. 2 is a diagram showing fields of a LAN packet which may be used for communicating between nodes on the individual LAN segments shown in FIG. 1.

FIG. 3 is a block diagram of a communicator which operatively interconnects or bridges the LAN segments, as shown in FIG. 1.

FIG. 4 is a diagram showing fields of a bridge packet for communicating between communicators as shown in FIG. 1.

FIG. 5 is a diagram of an address table representing the organization and functionality of a data structure contained in a memory of the communicator shown in FIG. 2.

FIG. 6 is a state transition diagram showing the operation of the communicators shown in FIGS. 1 and 3.

FIGS. 7a and 7b are respective portions of a flow chart of the operations of the communicators shown in FIGS. 1 and 3 in response to the receipt of a bridge packet.

FIGS. 8a and 8b are respective portions of a flow chart of the operations of the communicators shown in FIGS. 1 and 3 in response to the receipt of a LAN packet.

DETAILED DESCRIPTION

A plurality of LAN segments which may be bridged in accordance with the present invention are shown in FIG. 1 and referenced as 30a, 30b, 30c, 30d, 30e, and 30f. LAN segments generally will hereinafter be referred to by the reference number 30, while specific LAN segments shown in FIG. 1 will be referenced by an alphabetical identification in conjunction with the reference numeral 30 as shown. Each LAN segment 30 is in actuality a LAN which includes a bridge device described below as a communicator 60 and at least one conventional LAN node. Each LAN segment 30 includes a physical communication medium 32 which connects nodes 34 of each LAN segment 30 in a bus topology. The communication medium 32 will typically take the form of electrical connectors and wires interconnecting the nodes 34, but may also include radiant energy links, such as modulated light links, as are known to be employed in LANs.

Each node 34 comprises a network interface 36 connected to the communication medium 32, and a resource 38 connected to the interface at each node 34. The resource 38 can assume a variety of different configurations, as is known, but will typically include a computer such as a work station, portable computer, personal computer, printer, server, or the like.

Communication between separate nodes 34 and the resources 38 on those LAN segments 30 which have multiple nodes 34 and resources 38, such as LAN segments 30e and 30b, is accomplished in accordance with a network protocol which governs the transmission and receipt of communications, known as packets, over the medium 32 linking the interfaces of the nodes 34. Communication between the nodes 34 and the communicators 60 on each LAN segment 30 is also governed by the network protocol. The communication actually is undertaken by the interfaces 36 transmitting and receiving packets over the communication medium 32 to establish communication between the nodes 34. The form of the packets is also controlled by the network protocol.

To allow orderly and reliable communication between the nodes 34, each node 34 has its own node address or NID. The NID of each node 34 is maintained by the interface 36 associated with the node. As shown in FIG. 1, exemplary NIDs for each node are illustrated enclosed within circles within the rectangles designating each node 34. The packets transmitted from a source node typically contain the address of the source node sending the packet, (an SID), and the address of the destination node to which the packet is addressed, (a DID), in accordance with the typical network protocol.

As previously noted, the NID maintained by each interface 36 may be globally unique, meaning that no other interface 36 ever manufactured has the same NID. The NID will always be locally unique, meaning that no other node 34 on a LAN segment 30 will have the same NID. It is important that the NIDs be unique on each LAN segment 30 so that each node 34 can unambiguously address other nodes 34 on the same LAN segment 30. Otherwise, it would be impossible to achieve meaningful communications with any node 34 sharing a common address with another node 34 on the same LAN or LAN segment 30, because both nodes 34 would attempt to respond to communications addressed to the common NID identifying both nodes 34.

The NIDs become associated with each interface 36 in a variety of ways. Interfaces 36 with globally unique NIDs are manufactured with preset, unique NIDs. Locally unique NIDs typically are manually assigned when the LAN segment 30 is installed or built, usually by setting mechanical switches or jumpers on the interfaces. Some network protocols, like the one employed in LocalTalk LANs, dynamically assign NIDs to the interfaces 36 on the local LAN segment 30 when the LAN becomes functional. Because the present invention has particular utility for LANs using dynamically assigned NIDs, such as LocalTalk, the LocalTalk protocol for dynamically assigning NIDs will be described. However, it should be understood that the present invention also has applicability to bridging separate LAN segments 30 using other network protocols where there is a possibility of the bridged LAN segments 30 having duplicate, NIDs.

In LocalTalk, the network interface 36 associated with each resource 38 first assumes an address for itself upon being activated by sending a series of special address inquiry packets addressed to a randomly-selected NID which is specified as the DID of the packet. If a response is received, this signifies that another node 34 has adopted and is using that NID, and another NID will be randomly selected by the interface 36. The process is repeated until the originating node 34 fails to draw a response to address the inquiry packets directed to the randomly selected NID for a sufficient period of time. When no response is received, signifying that no other node 34 is using that NID, the interface 36 claims that NID as its address for as long as that node 34 and interface 36 remain active. To preserve the uniqueness of the NID reserved by the interface 36, the interface 36 will always return an acknowledgment to each address inquiry packet addressed to that NID to prevent other nodes 34 from adopting the same NID, thereby defending the address it has adopted.

Some network protocols also permit the identification of a resource 38 by a resource name, such as "Server," or "Printer", or "Mike's Node" or the like. In these cases, the resource name is associated with the NID used by the interface 36 of the node 34 at which the resource 38 is located. This NID value is used as the DID in packets directed to the node 34 associated with the functional name, and that NID value will be the SID in packets sent from that node 34. The association between resource names and NID values must be determined by each node needing to access such resources via the network. This determination may be achieved by various methods, depending upon the network software. Common techniques include broadcasting a request on the network containing the resource name and awaiting a response from the node that possesses the resource, querying a "directory" or "name service" function on some network node, or consulting a name table defined manually by a system administrator.

The format of a typical LAN packet 40 is shown in FIG. 2. The LAN packet 40 shown in FIG. 2, comprises a number of fields 42, 44, 46, 48, 50, 54, 56 and 58. The number, order, structure and content of these fields are predetermined in each LAN packet 40 according to the network protocol. The first field is a preamble field 42 that contains information which identifies the start of the packet transmission and may be used to facilitate successful reception of the packet, such as by providing synchronization or reference patterns. The preamble field 42 is followed by a packet-type field 44 which signifies the purpose, usage, and/or format of the packet, and the basis on which to interpret the data contained within the message field 54 of the LAN packet 40. The packet-type field 44 is followed by a destination identification or DID field 46. The DID field 46 contains the address (NID) of the node (or nodes, in the case of a broadcast or multicast destination) 34 to which the LAN packet 40 is directed. The DID field 46 is followed by a source identification or SID field 48. The SID field 48 contains the address (NID)of the node 34 which is transmitting the LAN packet 40. The SID field is followed by a length field 50. The length field 50 contains a representation of the amount of information contained in the message field 54 of this LAN packet 40. Typically, all fields of a LAN packet 40, with the exception of the message field 54, are of fixed, predetermined lengths. The message field 54 contains any data which is being transferred in this LAN packet 40, and may also include other types of control information as needed in accordance with the packet type specified in the type field 44. After the message field 54 of the LAN packet 40 is the error check field 56. The error check field 56 contains parity checking, cyclic redundancy checking, or other error correcting or error detecting information which may be used to check for (and/or correct) errors in the content of the preceding fields of the LAN packet 40. After the error check field 56 may be a postamble field 58 to identify the end of the packet transmission, convey status information about the packet, and/or to provide a separation (gap) prior to the next LAN packet.

In general, when a LAN packet 40 is transmitted between nodes 34 on a LAN segment 30, the information contained in the message field 54 is supplied by the resource 38 connected to the interface 36 at the node 34. The interface 36 supplies the information for many of the header and trailer fields, including the preamble field 42, the packet type 44, the SID field 48, the error check field 56 and the postamble 58. The interface 36 assembles the LAN packet 40 incorporating DID field 46, length field 50, and message field 54 information supplied by the resource 38, and then delivers the LAN packet 40 to the communication medium 32 for transmission to the destination node(s) 34 designated in the DID field 46.

The interface 36 at the destination node 34 specified in the DID field 46 of the LAN packet 40 accepts the LAN packet 40, while the interfaces 36 of the nodes 34 to which the LAN packet 40 is not addressed disregard the LAN packet 40. If the packet-type field 44 indicates that the LAN packet 40 is a data packet, the interface 36 at the destination node 34 then strips off the leading and trailing fields 42, 44, 50, 56 and 58 of the LAN packet 40, and delivers the information contained in the address, length, and message fields 46, 48, 50, and 54 of the LAN packet 40 to the attached resource 38. Of course, control, status and administrative information may be transmitted between resources in this same manner by designating a predetermined code in the packet-type field 44 of the LAN packet 40 indicating that this packet is such a control status or administrative packet, and by placing the control and status information in the message field 54 of the LAN packet 40. In this case, the interface 36 may store or act upon the contents of the message field 54 rather than passing the contents to the attached resource 38; or the interface 36 may pass the contents of the address, length, and message fields 46, 48, 50 and 54 of the LAN packet 40 to network control functionality at the node 34 rather than to the resource 38.

In the LocalTalk protocol, at the link level where the present invention typically operates, there are five types of LAN packets which may be transmitted on a LAN segment 30. LocalTalk uses two types of packets, the link access protocol inquiry (lapENQ) and the link access protocol acknowledgement (lapACK) for dynamically allocating addresses (NIDs) for a LAN segment. The remaining types of packets include link access protocol request to send (lapRTS), link access protocol clear to send (lapCTS), and link access protocol data (lapDATA). These latter three types of packets are used for requesting clearance to send data, giving clearance to send data, and for the transmission of substantive data itself, respectively. The packet type of the packet is designated in the packet-type field 44 of the LAN packet 40.

The lapENQ and lapACK packets are used by the network control functionality of the nodes 34 on each network segment to control allocation of addresses. As previously stated, when a resource 38 is first activated on the network, the LAN interface 36 associated with that resource 38 chooses an NID from the possible set of usable addresses on the network, which in LocalTalk is from 1 through 254. The LAN interface then generates a lapENQ packet, specifying in the packet-type field 44 that the LAN packet 40 is a lapENQ packet, setting the DID field 46 equal to the chosen NID, and specifying the same chosen NID in the SID field 48 of the packet 40. The lapENQ packet is then transmitted by the network interface 36 on the LAN segment 30. The lapENQ packet will be transmitted multiple times (128 is a common repetition count) to allow for transient transmission errors which might interfere with the transmission and reception of the lapENQ packet on the LAN, and to allow for the possibility that the node that is already using this NID is too busy to respond immediately.

If the address used in the lapENQ packet has been adopted by another node 34, the network interface 36 of that node 34 will transmit a lapACK packet. The lapACK packet specifies in the packet-type field 44 that it is a lapACK packet, and specifies in the DID field 46 and the SID field 48 its NID, which is the same as that specified in the DID field 46 and the SID field 48 of the lapENQ packet which prompted the lapACK packet. When the interface 36 which generated the lapENQ receives the lapACK in response to its lapENQ, the interface 36 knows the chosen NID is already in use, and the network control functionality of the node 34 will choose another NID and repeat the lapENQ process until it fails to receive a responsive lapACK packet to its lapENQ packets, indicating that randomly chosen NID is unused. On the other hand, if the lapENQ packet was transmitted the predetermined number of times and a responsive lapACK packet is not received, the interface 36 issuing the lapENQ will adopt the NID specified in the DID field 46 and the SID field 48 of the lapENQ.

Once network addresses have been adopted, the other types of LocalTalk packets are used in transmitting data across the LAN. In transmitting a single message across the network, the interface will employ all four of the lapRTS, the lapCTS, the lapACK and the lapDATA packets. To initiate the sending of a message at the request of the attached resource 38, first the interface 36 will send a lapRTS packet. In the lapRTS packet, the interface 36 specifies in the packet-type field 44 that it is a lapRTS packet, identifies in the DID field 46 the NID of the destination resource 38 or zero to indicate a broadcast to all destinations and the NID of the source in the SID field 48. Upon receipt of the lapRTS packet at the destination, if the destination interface 36 is able to accept a message, it will send a lapCTS packet whose packet-type field 44 is specified as lapCTS, the DID field 46 includes the NID of the node 34 which generated the lapRTS packet (the NID specified in the SID field 48 of the lapRTS packet), and the SID field 48 includes the NID of the node 34 sending the lapCTS packet (the NID specified in the DID field of the lapRTS packet). Broadcast data packets are preceded by a lapRTS packet, but elicit no lapCTS response, and are transmitted without waiting for such a response.

Once the node 34 which sent the lapRTS packet receives a lapCTS packet from the destination node, it will then transmit the data in the form of a lapDATA packet, in which the packet-type field 44 specifies it is a lapDATA packet, the DID field 46 is set to the NID of the destination node, the SID field 48 is set to the NID of the node sending the message, the amount of data being sent is identified in the length field 50, and the substantive data to be sent is present in the message field 54. Once the destination node has received the lapDATA packet, it will check it to determine if it has been received correctly. If the lapDATA packet has not been properly received, the destination node will discard the packet. lapDATA reception is not acknowledged in the Localtalk protocol, although higher level protocols layered above LocalTalk typically include message acknowledgements. In sum, the lapRTS, lapCTS, and lapDATA packets are used to transmit information on the LAN by requesting authorization to send a message (lapRTS), getting authorization from the destination node to send the message (lapCTS), and sending the message (lapDATA). These groups of packets constitute one successful communication.

As is the case with almost all types of LANs in widespread commercial use, considerable information and components are publicly available. For example, LocalTalk is described in great detail in the book *Inside AppleTalk* (2d Ed.), published by Addison Wesley (Apple Computer, Inc. (c) 1990). In addition, a LocalTalk interface may be commercially purchased as a built-in portion of any model of the Macintosh ® computer family produced by Apple Computer, Inc., as well as an optional portion of products made by Farallon Corp., Shiva Corp., Cayman Systems, and others.

Considering FIG. 1, some of the LAN segments, i.e. 30a, 30c, 30d and 30f, are single resource, single node LAN segments. Thus, it is impossible to communicate between nodes on those LAN segments because two active nodes, a source node and a destination node, are required for packet communication, and two nodes do not exist on those LAN segments. The other LAN segments, i.e. 30b and 30e, permit LAN functionality between the nodes 34, because each LAN segment contains at least two nodes 34.

The main feature of the present invention is to bridge together the LAN segments 30, whether single node LAN segments (30a, 30c, 30d and 30f) or multiple node LAN segments (30b and 30e) so that all of the nodes 34, regardless of the type of LAN segment 30 upon which they appear, can achieve effective communication transparent to the network interfaces 36 and without altering the protocol used on any of the LAN segments 30. In essence, the bridged LAN segments 30 establish a single logical LAN which operates in accordance with a single protocol that provides suitable, higher-level functionality common to all the nodes. Of course to achieve this effect, it is necessary for all of the interfaces 36 to operate in accordance with the appropriate network protocol for their LAN segments 30, and for all of the bridge communicators 60 to operate in accordance with a single protocol.

To bridge the LAN segments 30 together for effective communication between the nodes 34, communicators 60a, 60b, 60c, 60d, 60e and 60f are connected to each LAN segment 30a, 30b, 30c, 30d, 30e and 30f, respectively, as is shown in FIG. 1. Each communicator will hereinafter be generally referred to by the reference number 60, while specific communicators shown in FIG. 1 will be referenced by an alphabetical identification in conjunction with the referenced numeral 60 as shown.

Each communicator 60 communicates with the node or nodes 34 on the LAN segment 30 to which it is locally attached. A "local" node or LAN segment is the one which is directly connected by the communication medium 32 to the communicator 60 with regard to which the reference "local" is made. A "remote" node or LAN segment is one which is not directly connected by the communication medium 32 to a communicator 60, which is distinct from the local LAN segment with regard to which the reference "remote" is made.

Each communicator 60 includes a LAN interface 36. The interfaces 36 in the nodes 34 and in the communicator 60 are the same, and they operate in accordance with the same network protocol. Communications over the local LAN segment between communicator 60 and each node 34 occur through the interfaces 36 and the communication medium 32 in accordance with the network protocol (typically LocalTalk), just the same as communications between two nodes 34 on a local LAN segment. Because the interfaces 36 associated with the communicators 60 communicate with the interfaces 36 associated with the nodes 34 under the same protocol, the interfaces 36 associated with the communicators 60 must have an NID like the other LAN interfaces 36. However, the communicators 60 are not nodes 34, as that term is used to describe LAN functionality, because the communicator 60 achieves the administrative functions associated with bridging instead of the usual information processing functions associated with a resource 38.

Because each communicator 60 must have an NID to communicate over the local LAN segment 30, it is necessary for the interface 36 of the communicator 60 to participate in the same LocalTalk process as the interfaces 36 associated with the nodes 34 described above, where its interface 36 dynamically claims an address for itself upon being activated. Similarly, the interface 36 of the communicator 60 defends its NID by sending lapACK packets in response to lapENQ packets from other interfaces 36 as they establish their NIDs. It is through participating in this process that a table of NIDs operative on the local LAN segment is established in each interface 36. As shown in FIG. 1, exemplary NIDs for each communicator 60 are shown by numbers enclosed within circles within the rectangles designating each communicator 60.

The general nature of a communicator is shown in FIG. 3. In addition to the interface 36, each communicator 60 includes a microcontroller 66 connected by a bus 68 to the interface 36, a read only memory (ROM) 70, a random access memory (RAM) 72, and a RF modem 74. Each communicator has an interface (in this case the RF modem 74) to an alternate network medium, that typically operates over a different physical interface type and under a different protocol than the LAN interface 36. In the preferred embodiment of the present invention, this alternate interface is a low-power, spread spectrum radio data link; however, other types of data links, including different radio techniques, infrared communication links, and the like, can be utilized with appropriate modems. The microcontroller 66 in its presently preferred form, is a commercially available Motorola 68HC16 microprocessor. The instructions controlling the operation of the microcontroller are stored as firmware in the ROM 70 and/or RAM 72. These instructions implement a bridge function which governs the communications between the communicators 60. The interface 36 is also connected to the communicator's internal bus 68 for exchanging information in a manner similar to that which the interface 36 of a node 34 exchanges information with its attached resource. The RAM 72 is available as a buffer to temporarily store information used when the communicator 60 is functioning and to store LAN packets 40 received from or delivered by the interface 36 and the RF modem 74.

To bridge the LAN segments 30, the communicators 60 transmit and receive radio frequency (RF) signals with one another, using the RF modem 74 and an antenna 76. The RF modem 74 operates under the control of the microcontroller 66 to send and receive the signals between the communicators 60. The preferred form of the RF modem 74 is a Model 100 direct sequence spread spectrum (DSSS) RF Modem manufactured and sold by Signal Technologies, Inc., of Longwood, Fla. The preferred form of the RF modem 74 includes an interface for exchanging data with the bus 68 and other components which control the synchronization and modulation of the spread-spectrum signal. In addition, four different frequency channels are used to exchange signals between communicating RF modems 74, allowing for complete coverage with minimum redundancy. The signals, received from the bus 68 in eight or sixteen bit words, are converted from parallel to serial format, and are modulated onto one of the four channels for transmission. The sending frequencies all fall within the Federal Communications Commission authorized band of 902 to 928 MHz, as described in Title 37 of the Code of Federal Regulations, Part 15. Any suitable antenna 76 operative to receive and broadcast in the 902 to 928 MHz band can be used.

The number of nodes in the single logical network established by bridging the communicators 60 may depend on the transmission range of the communicators 60. The range may be limited due to government regulations limiting the amount of the power of the broadcast signal, by interference from other radio transmitters and/or by obstacles and obstructions which may block the RF signals. Accordingly, not all of the communicators 60 may be able to establish RF communications with one another, and not all of the segments 30 (with their attached nodes 34) may be present in the single logical network at all times. For example, in the arrangement shown in FIG. 1, the LAN segment 30f is not within the transmission range of the LAN segments 30a through 30e, the transmission range being represented by the circle 78. Therefore, communications between the communicators 60a–60e will not reach the communicator 60f. These types of obstacles are quite common in wireless or RF LANs, and account for some of the problems in the field of wireless LANs which the present invention has solved, as described below.

Although a wireless or RF communication between the communicators 60 is illustrated and described, it should be understood that hard-wired or other direct communication means may be employed to accomplish the bridging of the present invention. In hard-wired or direct communication arrangements, there will be no issue that any of the communicators 60 are out of range or disconnected from the others. Regardless of whether a wireless or a direct communication path is provided between the communicators 60, the present invention will be applicable. It should also be appreciated that the RF modem 74 is only used in conjunction with the wireless RF bridging technique generally illustrated in FIG. 1. When a direct communication path is provided for the bridging communications between LAN segments 30, rather than an RF link, a communications device suitable for transmitting signals over the direct bridging communication path will be substituted for the RF modem 74 and antenna 76.

The information communicated between communicators 60 is the information which is supplied to and delivered from the communicator 60 over the LAN segments 30 with additional information appended to support the functionality of the bridge communication medium and to assure the integrity of communications between the communicators 60. In particular, the information to be transmitted by a sending communicator 60 to another, receiving communicator 60 is received by the sending communicator 60 over the communications medium 32 from the local LAN segment 30 via the interface 36 associated with the sending communicator 60. The information received by the receiving communicator 60 is delivered to the LAN segment 30 connected to the receiving communicator 60 via the communications medium 32 by the interface 36 associated with the receiving communicator 60. In this manner communications from a node 34 on one LAN segment 30 to a node 34 on a different remote LAN segment 30 are achieved. Since the effect of the communicators 60 does not diminish the functionality of the local LAN segment 30 but adds to it, a single logical network among all of the nodes 34 on all of the LAN segments 30 is achieved. Bridging by the communicators 60 of the present invention connects the LAN segments 30 together automatically and transparently.

Each communicator 60 has its own globally unique communicator address, referred to hereafter as a communicator identification (CID). The CID is established when each communicator is manufactured, by recording the CID in the ROM 70 of the communicator 60. The CID is used to direct and control communications between the communicators 60 during bridging of the LAN segments 30. Some of the NIDs of the nodes 34 on each LAN segment 30 may have duplicate NIDs, but the ambiguous nature of the communications is resolved when bridging the LAN segments 30 by including the globally unique CID of the source and destination communicators 60 to establish a "tuple" for intercommunicator communications. Exemplary CIDs for each communicator are shown by letters enclosed in circles within each communicator.

The communications between communicators 60 are in the form of bridge packets, one of which 80 is shown in FIG. 4. By comparing the LAN packet 40 shown in FIG. 2 with the bridge packet 80 shown in FIG. 4, it is apparent that the bridge packet 80 contains an encapsulated LAN packet 40 (less the preamble 46 and the postamble 58) with a header block 82 preceding the LAN packet and a trailer block 83 following the LAN packet. The header block 82 comprises a preamble 84 appropriate for the physical data link used by the bridge (in the preferred embodiment RF signals employed by the communicator 60) and communicator destination identification (CDID) field 85 which contains the address to which the bridge packet 80 is addressed followed by a communicator source identification (CSID) field 86 which contains the CID of the communicator 60 sending the bridge packet 80. Additional control information pertaining to the bridge packet 80 may be included in a communication (COMM) control information field 87. The CDID field 85 and CSID field 86 are used to direct the bridge packets 80 between the specifically identified source and destination communicators 60. The trailer block 83 includes a communication (COMM) error check field 89, used to detect and/or correct errors that may occur during data transfer between communicators 60 and a postamble 89, as may be appropriate to the data link between communicators 60.

A bridge protocol recorded in the ROM 70 and/or RAM 72 of the communicators 60 controls the sending and receipt of the bridge packets 80 in a manner similar to the manner in which a network protocol controls the communications on a LAN segment. The destination communicator 60 removes the header block 82 and the trailer block 83, and the remainder of the bridge packet 80, essentially the original LAN packet 40, is delivered by the interface 36 of the destination communicator 60 to the connected LAN segment 30. The LAN packet 40 thus placed on the LAN segment 30 by the destination communicator 60 is the same as the LAN packet 40 received by the sending communicator 60 on its connected LAN segment 30, relayed by the source and destination communicators 60 in a bridge packet 80.

By encapsulating the LAN packet 40 in the bridge packet 80 and communicating the bridge packets 80 between communicators 60, the information originating from a resource 38 at a node 34 on a local LAN segment 30 is communicated by communicators 60 in bridge packets to a resource 38 of a node 34 on a remote LAN segment 30. The fact that the LAN packet 40 was passed through the communicators 60 and not simply over a LAN segment 30 is transparent to the node 34 receiving the LAN packet 40, just as the source node 34 of the LAN packet 40 is not aware the LAN packet 40 will be sent through the communicators 60. Accordingly, other than by connecting the communicators 60 to the communications medium 32 of the LAN segments 30 and thereby adding the communicators 60 to the LAN segments 30, no changes need to be made to the LAN segments 30, their attached nodes 34, the resources 38 or the network protocol used on the separate LAN segments 30 when the communicators 60 bridge these LAN segments 30 together into a single logical network.

One of the significant functions which the communicators 60 must perform is to successfully bridge LAN segments 30 to achieve reliable, unambiguous, transparent communications of LAN packets 40 between nodes 34 on separate LAN segments 30. To accomplish this, the communicator 60 first determines whether a LAN packet 40 received by its interface 36 is destined for a node 34 on the attached local LAN segment 30 or for a node 34 on a remote LAN segment 30. If the LAN packet 40 is addressed to a node 34 on the local LAN segment 30, the communicator 60 allows the network protocol of the local LAN segment 30 to control the delivery and communication of the LAN packet 40. If addressed to a node on a remote LAN segment 30, the communicator 60 appends the header block 82 and trailer block 83 to encapsulate the LAN packet 40 as a bridge packet 80 and sends the bridge packet 80 to the destination communicator 60 connected to the remote LAN segment 30 to which the destination node 34 is connected. The destination communicator 60 connected to the remote LAN segment 30 accepts the bridge packet 80, removes the bridge packet header block 82 and trailer block 83 and delivers the LAN packet 40 to its destination node 34 on its attached LAN segment 30 through its interface 36.

These functions can only be achieved if each communicator 60 has information which identifies each node 34 to which a LAN packet 40 is destined as either a local node or a remote node. If a node 34 is a remote node, it must further be associated with the CID of the communicator 60 that is connected to the LAN segment 30 which includes the node 34 to which the LAN packet is addressed. In order to make the determination, the communicator 60 uses an address table 90 (FIG. 5) to record this information for use by the communicator 60. The structure of the address table 90 and the information in it are present in the RAM 72, and the address table is described in greater detail below.

The association of the NID and the CID for each remote node forms a "tuple." The tuple is included in the bridge packets 80, since the NID of the destination node is contained in DID field 46 and the CID of the destination communicator 60 is contained in the CDID field 85 (FIG. 4). As will be explained subsequently, the tuple is unique since the CID is globally unique and no more nodes 34 are permitted to be present collectively on the bridged LAN segments than the maximum number of nodes 34 which the network protocol permits on a local LAN segment.

An example of the use by the communicator 60 of the tuple information is shown in FIG. 1. Assume, for example, that node 11 on LAN segment 30e intends to send a packet to node 23 on LAN segment 30b. Assume further that these nodes on these LAN segments are aware of each other and appropriate entries have been made in the address tables 90 of communicators 60e and 60b. The interface 36 associated with node 11 will prepare a LAN packet, entering the NID of 23 in the DID field 46, the NID of 11 in the SID field 48, and the other information in the other fields as appropriate. Through its interface 36, the communicator 60e on LAN segment 30e receives the LAN packet addressed to a remote node, namely node 23. Communicator 60 is able to determine that node 23 is not local and is present on LAN segment 30b by consulting the entry for node 23 in its address table 90. The globally unique CIDs for communicator 60e and 60b are "e" and "b" respectively, and the communicator 60 will create a bridge packet by appending a header block 82 and trailer block 83 to the LAN packet and enter "b" in the CDID field 85 and "e" in the CSID field 86. The communicator 60e will then transmit the bridge packet.

Communicators 60a, 60c and 60d will detect the bridge packet (communicator 60f is out of the transmission area 78), but determining that the CID in the CDID field 48 of the bridge packet 80 designates a different communicator, communicators 60a, 60c and 60d will ignore the bridge packet 80. However, communicator 60b will detect the bridge packet 80 and will accept the bridge packet 80 based on its CDID value. The communicator 60b then will strip the header block 82 and trailer block 83 from the bridge packet 80, and transfer the resulting, original LAN packet 40 to the LAN interface 36, where it will be transmitted (after appending a preamble 42 and a postamble 58) on LAN segment 30b for reception by node 23. In this manner, the LAN packet is transmitted from node 11 on LAN segment 30e to node 23 on LAN segment 30b without either node 11 or node 23 being aware that they were not connected to the same LAN segment or that the communicators 60e and 60b relayed the LAN packet.

Another very important function of the communicators 60 must perform is to resolve duplications of NIDs among different nodes 34 on separate LAN segments 30 to maintain reliable, unambiguous communications between nodes 34 having the same NID. The problem of two or more nodes 34 having the same NID is a problem which will not occur on any single LAN segment, because the network protocol prohibits LAN interfaces from adopting the same NIDs. NID duplication will not normally occur for those nodes which become active while the communicators 60 attached to their LAN segments 30 are in the broadcast area 78, because communicators 60 aware of the use of an NID on a remote LAN segment will transmit lapACK packets in response to lapENQ packets during the dynamic NID selection process to defend an NID which the communicator 60 knows is active on a remote LAN segment, which will be further discussed below.

However, in a wireless bridged logical network as shown in FIG. 1, it is possible for nodes on separate LAN segments 30 to adopt the same NID. For example, if a node 34 becomes active on a LAN 30 segment which is not in the broadcast area 78 or while communications to the communicator 60 connected to that LAN segment 30 are disabled due to shadows, radio interference or signal blockages, the interface of the newly active node 34 may dynamically claim a NID which is already in use on the LAN segment 30 with which it is not in communication. If the broadcast area 78 later expands or the communicator 60 and the attached node or nodes 34 move into the broadcast area 78 (which could occur when the node resource is a portable computer which is attached to its own portable communicator), there will be NID duplication. Once a LocalTalk interface has claimed its NID, it will not go through the selection process described above until it is reset or powered off and back on.

An example of NID duplication is shown in FIG. 1 where in addition to a node on LAN segment 30e having adopted NID 11 as previously described, there also is a node using NID 11 on LAN segment 30b. Considering the previous example, node 11 on LAN segment 30e was able to communicate with node 23 on LAN segment 30b because node 11 was able to distinctly and unambiguously address node 23 on LAN segment 30b. However, if node 23 needed to respond to node 11, there is a problem because unambiguous communication is not possible when two nodes share the same NID. If the SID of the LAN packet specifies node 11, there are two nodes 34 having NIDs equal to 11, and a packet cannot be singularly directed to the desired destination node, node 11 on LAN segment 30e.

To resolve this problem and maintain reliable, unambiguous communications between nodes on different segments 30 having the same NID, the communicator 60 of the LAN segment containing the duplicated NID assigns an unused NID value as an "alias" identification (AID) for the NID which is duplicated on the local LAN segment 30. Thereafter that communicator will substitute the AID for the SID in the SID field 48 on remotely originated LAN packets 40 received by the communicator 60 sent from the node having the NID which is the same as that of a node on the local LAN segment. Thereafter the LAN packet 40 with the AID substituted for the SID will be delivered to the local LAN segment 30. No confusion exists on the local LAN segment 30 because the substitution of the AID avoids any duplication of NIDs on the local LAN segment 30 and in the DID fields 46 and SID fields 48 of the LAN packets 40. The response from the destination node 34 on the LAN segment 30 having the node with the duplicate NID is directed to the AID. The communicator 60 on that LAN segment recognizes that the response is to the AID, and this communicator 60 substitutes the actual NID for the AID in the DID field 48 of the LAN packet 40 before the communicator 60 forms and sends the bridge packet 80 to the communicator on the originating LAN segment 30. The communicator 60 makes use of the address table 90 (FIG. 5) to correlate the information between the AIDs and the NIDs of remote nodes 34.

An example of the substitution of an AID for the DID to achieve effective communications with nodes with duplicated NIDs on remote LAN segments is shown in FIG. 1. Node 11 on LAN segment 30e directs a LAN packet to node 23 on LAN segment 30b. Communicator 60e recognizes that node 23 is located on LAN segment 30b, builds a bridge packet 80 by appending a header block 82 and a trailer block 83 to the LAN packet 40, inserting the CID of b indicating the destination communicator 60b in the CDID field 84 of the bridge packet 80 and the CID of e indicating the source communicator 60e in the CSID field of the bridge packet 80, and transmits the message. This time, however, when communicator 60b detects that the bridge packet is directed to it (by discerning its own CID in the CDID field of the bridge packet 80), it does not simply strip the header block 82 and trailer block 83 from the bridge packet 80 and relay the resulting LAN packet 40 over the interface 36 to the LAN segment 30b. The microcontroller 66 of communicator 60b, having stored the bridge packet 80 in its RAM 72, detects that the SID field 46 of the LAN packet 40 specifies NID 11. NID 11 is an NID which, according to the address table 90 in its RAM 72, is already in use on the local LAN segment 30b. The communicator 60b aliases this duplicated NID.

To alias the duplicate NID, the microcontroller 66 checks its address table 90 for an NID value which is not being used. When it finds an unused NID, for example, assuming NID 27 is the unused NID selected, the microcontroller 66 substitutes NID 27 for NID 11 in the SID field 48 of the LAN packet 40, records in the address table that NID 27 is now an AID for NID 11 on LAN segment 30e, and routes the LAN packet 40 over its interface 36 to LAN segment 30b where it will be received by node 23. Now, when node 23 responds to this LAN packet, it will respond to node 27, the alias NID which was specified in the SID field 48 of the LAN packet 44 it received. The communicator 60b will detect in the response a LAN packet 40 having a DID field 46 specifying destination NID 27, and will recognize this DID as an alias for NID 11 on LAN segment 30e. The communicator 60b then replaces NID 11 for NID 27 in the DID field 46 of the LAN packet 40, encapsulates this LAN packet 40 in a bridge packet 80, appends a header block 82 signifying the CID of the destination communicator for LAN segment "e" in the CDID field 84 of the bridge packet 80 and its own CID "b" in the CSID field 86 of the bridge packet 80, appends a trailer block 83 and transmits the bridge packet 80. Communicator 60e receives this bridge packet 80, and forwards the encapsulated LAN packet 40 to the designated destination (node 11) via its interface 36 to the local LAN segment 30e. Ultimately, node 11 on LAN segment 30e receives a response to its message, unaware that node 23 exists on a different LAN segment, that the packet was relayed by the communicators 60e and 60b, or that there is another node using NID 11 on that other LAN segment.

The substitution of AIDs for the DIDs will even allow reliable, unambiguous communications between two nodes 34 on different LAN segments, each of which have the same NID value. Although the network protocol prohibits a node from sending a LAN packet to a DID which has the same NID value as its own NID, in those cases where nodes 34 were initialized on separate LAN segments, such communication must be able to occur, since the bridging of the present invention renders the existence of the bridges and multiple network segments transparent to the nodes 34.

The situation of achieving reliable, unambiguous communication between the nodes on different LAN segments but having the same NID value is also shown in FIG. 1. Assume in this example that node 11 on LAN segment 30e desires to communicate with a resource functionally-named "SERVER" which happens to be located at node 11 on LAN segment 30b. Node 11 on LAN segment 30e determines the location of resource "Server" by generating a broadcast LAN packet for the name resolution of "Server". This LAN packet is transmitted by node 11 on LAN segment 30e with a value of zero in the DID field 46 (indicating broadcast) and a value of 11 in the SID field 48. When a communicator (in this case 60e) receives a LAN packet with a broadcast DID from the local LAN segment (in this case 30e), the communicator sends this LAN packet 40, encapsulated in a bridge packet 80, to all other communicators in the RF communication range 78 as a broadcast bridge packet. Communicator 60b receives the request, but detects the SID field 48 of the LAN packet encapsulated in the bridge packet 80 specifies that the source node is node 11. For this case, communicator 60b already has created an AID for NID 11, and the same substitution of NID 27 for NID 11 occurs as previously described prior to sending this LAN packet on LAN segment 30b from the interface 36 of communicator 30b. If this alias had not already existed, communicator 60b would create the alias at this time. The communicator 60b then strips the header block 82 and trailer block 83 and routes the LAN packet 40 from the interface 36 to LAN segment 30b. Node 11 on LAN segment 30b receives the broadcast LAN packet and, because the resource "SERVER" exists at this node, responds to the broadcast LAN packet with a directed LAN packet to the DID obtained from the SID field of the broadcast LAN packet. The response packet specifies node 27 in the DID field 46 of the response packet and node 11 in the SID field 48 of the response packet. Communicator 60b recognizes that node 27 specified in the DID field 46 of the LAN packet is an AID for node 11 on LAN segment 30e. Accordingly, the communicator 60b substitutes the actual NID 11 for AID 27 in the DID field, encapsulates the LAN packet in the appropriate header block 82 and trailer block 83, and transmits the bridge packet 80 to communicator 60e.

When the bridge packet is received at communicator 60e, the microcontroller 66 of communicator 60e detects that the SID field 48 of the LAN packet 40 specifies NID 11 which, according to the address table 90 of communicator 60e, is already in use on local LAN segment 30e. Accordingly, the communicator 60e then searches its address table 90 for an unused NID, for example NID 19. The communicator 60e then records in its address table that NID 19 is an AID for NID 11 on remote LAN segment 30b, substitutes AID 19 for NID 11 in the SID field of the LAN packet, and transmits the LAN packet 40 stripped of its bridge packet header block 82 and trailer block 83 over its LAN interface 36 to LAN segment 30e. Ultimately, node 11 on LAN segment 30e receives this response. LAN segments 30b and 30e have exchanged information unaware they were not on the same LAN segment, that the communicators 60b and 60e relayed their LAN packets, or that they were both using the same NID value. After this exchange to resolve the resource name, subsequent messages are exchanged using directed packets with each node 11 using a value of 11 in the SID field 48 of LAN packets being transmitted, and the appropriate values in the DID fields 46; node 11 on LAN segment 60e uses DID=19 and node 11 on LAN segment 60b uses DID=27.

In the same manner it is possible that three or more nodes 34, each on different LAN segments 30, could have adopted the same NID, and the aliasing would take place in the same manner at the communicators 60 at all LAN segments 30 having nodes 34 with duplicated NIDs. The substitution of aliases at the communicator 60 that detects the duplication on LAN packets 40 of incoming bridge packets 80, and the reversion of AIDs to their original NID values in LAN packets 40 outgoing through bridge packets 80 at the same communicator 60, means that all encapsulated LAN packets 40 being sent in bridge packets 80 have their original DID values, thereby allowing an arbitrary number of different aliases on an equivalent number of different LAN segments, for each NID.

In essence, it is this feature of address aliasing that is a major improvement in bridging LAN segments 30, and it is as a result of address aliasing that transparent, reliable, unambiguous communications result in the presence of duplicative or replicative NIDs.

The address table 90 shown in FIG. 5 enables each of the communicators 60 to accomplish aliasing and communications using tuples. The data structure of the address table assumes a chart-like configuration having the rows and columns as shown. The data in the address table is dynamically built and stored within the RAM 72 of each communicator 60 as a result of each communicator 60 monitoring the communications between the bridged LAN segments 30.

In implementing the present invention, one restriction is that no more than the maximum number of NIDs will be permitted on the logical network of all the bridged LAN segments 30. Thus, in the example of LocalTalk, the total NIDs cannot exceed 254. LocalTalk uses a one byte address field, which allows for 256 addresses, but one address is reserved as a code for broadcast messages and one other code (255) is never used under the LocalTalk specifications. As a practical matter, the efficiency of communication using LocalTalk will limit the practical number of nodes on all of the bridged LAN segments to quantities substantially less than 254. On the other hand, the address aliasing technique described above is usable with a larger total node population than the number of discrete NID values, so long as the total number of nodes 34 communicating to and from each LAN segment 30 does not exceed the available number of NIDs. Because single networks of this size are rarely useful, there is usually no need to implement the complex handling of broadcast LAN packets 40 needed in such a situation.

Each row of the table presents information relating to each of the available NIDs shown in the first column, which is designated as the address column 92. Each table entry stores four elements of information designated by the second through the fifth columns for the address state 94, alias address 96, communicator address 98 and time stamp 100, respectively.

The address state column 94 describes the status of the NID designated in the first column. The status is one of six possible states which indicate the communicator's current assignment of the state of each NID, whether on the local LAN segment or on all remote bridged LAN segments. All 254 useable NIDs, 1 through 254, will ultimately be assigned a particular state. Generally, for NIDs whose existence is unknown on any LAN segments 30, the state will be unknown (UNK). For NIDs that are not present on the local LAN segment and not known to exist on any remote LAN segment 30, the state assigned will be not present (NPR). For active NIDs on the local LAN segment 30, those nodes 34 which are functional on the local LAN segment 30, the state assigned will be local (LOC). For NIDs, both nodes 34 and communicators 60, which are known to be active on remote bridged LAN segments 30, the state assigned will be remote (RMT). For NIDs that are active on the local LAN segment 30 as an alias or substitute for an active NID of a node on a remote bridged LAN segment 30, the state assigned will be alias (ALI). The NID which is assigned the alias state, will therefore be a local NID substituted for the NID of the remote node. Lastly, for the NID of the communicator 60 attached to each local LAN segment 30, the state assigned for that NID will be own (OWN).

The third column, the alias address column 96, contains the actual address of the NID on the remote bridged LAN segment 30 for which the local address in the first column is functioning as an alias, as shown by the state in the second column. The alias address field is meaningful only for entries having the address state of ALI.

The fourth column, the communicator address column 98, is that part of the address tuple which describes the address of the communicator 60 associated with each NID listed in the address table 90. This particular field contains the unique CID for each communicator 60 associated with the NID specified in the first column 92. The CID in the address column 98 is meaningful only for table entries with the address type ALI or RMT entered in the address state column 94.

The fifth column, the time stamp column 99, records an indication of the last time the table entry for each NID listed in the first column was updated. The information contained in the time stamp field is used by the bridge protocol to periodically update or remove records for each NID. The typical activity upon periodic update (once every several minutes for a LocalTalk network) is to downgrade entries in RMT and ALI state, for which no activity has been detected, to UNK state, and for LOC entries for which there has been no activity, to probe the NID to either reconfirm the LOC state or establish NPR state.

By use of the address table 90, it is therefore apparent that each communicator 60 can keep track of all 254 possible NIDs which may be bridged. One of six states in which each of the nodes is currently operating is indicated. The alias addresses (AIDs) and communicator addresses (CIDs) are also shown. The information in the address and communicator address columns allows the communicator 60 to form tuples to effect bridging. The time stamp is used to periodically update the entries on the table 90.

The nature and details of the operation of the communicators 60 in achieving reliable effective communications between bridged LAN segments 30 are described in conjunction with FIGS. 6 to 8.

As is apparent from the previous description, the microcontroller 66 and the instructions in the ROM 70 and/or RAM 72 operate as a state sequence machine, and FIG. 6 shows the three operational states. FIGS. 7 and 8 show the steps or flow of the functionality achieved in each of the states. The states in FIG. 6 and the steps in the flow of functionality shown in FIGS. 7 and 8 are each identified by a reference number for convenience of description.

The three operational states of the communicator 60 are an inactive state 100, an initialization state 102, and an active state 104, as shown in FIG. 6. The inactive state 100 is entered when the communicator 60 is initially powered on, or when operating to minimize the consumption of power and maximize battery life (as may occur under circumstances described more completely in the copending application cross-referenced above). The communicator 60 remains in the inactive state 100 with all of its circuitry not energized except an activity detector for detecting the presence of LAN packets 40 on the directly attached LAN segment 30, and a power supply for RAM memory 72 data retention, until network activity (the transmission of LAN packets 40) is detected.

Upon detecting activity, the communicator 60 exits the inactive operating state 100 and enters the initialization operating state 102. While in the initialization operating state 102, the communicator 60 sets all of the address table 90 entries to the UNK state, and claims an NID for use in communicating on its LAN segment 30. The NID claimed by the communicator 60 is identified in the address table 90 with its NID value set to OWN.

Also while in the initialization state 102, the communicator 60 enables its LAN interface 36 for the initial purpose of defending its OWN NID. Any lapENQ packets addressed to the NID of the communicators on the local LAN segment 30 elicit lapACK packets. The microcontroller 66 of the communicator 60 updates the address table 90 entries for all the NIDs contained in SID fields received in any local lapACK packet, local lapRTS packet, local lapCTS packet and local lapDATA packets, setting the address state in the address state column 94 in the address table 90 for each NID received to LOC, and then discards these LAN packets.

In addition, the communicator 60 performs a probe operation while in the initialization state 102. The purpose of a probe operation is to determine whether a given NID value is in use on the local LAN segment 30. The probe operation is a subset of the activities used by a newly initialized node on the local LAN segment 30 to claim an NID for its own use in communicating.

The probe operation involves sending a predetermined number of lapENQ packets for each of the NIDs being probed. If the NID value is in use, the node addressed by the lapENQ packets in the DID field 48 of the lapENQ packets is required to respond with a lapACK packet, and, if in use, will normally do so prior to the delivery of the full number of lapENQ packets. The receipt of a lapACK packet from the NID being probed, causes immediate cessation of the lapENQ packet transmissions. The failure to receive a lapACK packet from the NID being probed after a predetermined number of repetitions (typically 32) of sending lapENQ packets to the NID is considered a negative result, meaning that the NID is probably not in use. As a result, the address state 94 for the NID in the address table 90 will be set to NPR. On the other hand, receipt of a response to a lapENQ will result in this address state 94 for the NID being marked LOC.

The probing occurs sequentially through the NIDs. In the case that each of the NIDs is initially set in the state UNK, a lapACK response to a probe lapENQ will result in setting the address state in the address state column 94 in the address table 90 to LOC. In the case where the NID is in state UNK and a probe inquiry lapENQ packet does not result in a response by an lapACK packet, the address of the NID in the address table 90 is set to the state NPR. Since it is preferable to make two iterations through the entire address table 90 to confirm the address states of all of the addresses during the initialization state, probing will not normally occur for those NIDs which have previously recorded LOC as their states. In the case of an NID recorded as OWN, no probing occurs.

After two or more iterations through the entire address range, an adequate record of the address states for each of the states of the nodes 34 present on the local LAN segment 30 has been acquired. At this point, systematic probing is discontinued until the next entry into the initialization operating state 102.

The communicator 60 will transition to the active operating state 104 as a result of the address state of any of the address table entries being set to LOC by the end of the initial probing. The indication of an NID with an address state of LOC on the local LAN segment is an indication of operation of that node, and the communicator 60 must assume the active operating state 104 to respond to the locally active node. Transitions from the initialization operating state 102 to the inactive operating state 100 will occur if, at the end of the probe operation, all of the entries in the address state column 94 in the address table 90 are in the UNK or NPR state, except for the one NID which is claimed by the communicator 60, that NID being set to OWN. The transition to the inactive operating state 100 occurs in this circumstance because the event that caused the entry into the initialized state 102 has proven to be a false alarm, and there are no active nodes on the local LAN segment 30 for which bridging need occur.

While the communicator 60 is in the active state 104, it operates as is described below in conjunction with FIGS. 7 and 8. A transition from the active operating state 104 back to the inactive operating state 100 occurs if no activity from the local LAN segment or from a remotely bridged LAN segment is detected by the communicator 60 for a predetermined length of time, or if there is some type of failure of a power supply, such as a battery power supply, to the communicator 60, or upon a predetermined command, if a user desires to withdraw from participation in the communication over the bridged LAN segments 30.

The functionality of the communicator 60 in the active operating state 104 depends on whether the packet received is a bridge packet 80 received via the RF modem 74, or whether the packet is a LAN packet 40 from the LAN interface 36. The action taken by the communicator 60 also depends upon the address state in the address state column 94 of the address table 90 for the NIDs contained in the DID field 46 and in the SID field 48 of the LAN packet 40, whether directly received from the local LAN segment 30 or encapsulated in the bridge packet 80, the type of field designated in the packet-type field 44, and other factors described below.

The functionality of the communicator with regard to bridge packets received from another communicator is shown in FIGS. 7a and 7b. Operation begins while the communicator is awaiting the reception of bridge packets as shown at 110. In response to bridge packets, only lapDATA packets are encapsulated in the bridge packets. The other types of LAN packets are processed, acknowledged or ignored by the communicator on the originating LAN segment, and are not sent on between communicators. There are two possible actions in response to lapDATA packets received as bridge packets, and the course of action depends upon whether the lapDATA packet contains a broadcast DID value or is a message directed to a particular NID, as is determined at 112.

For lapDATA packets which are broadcast to all nodes (DID=0) and therefore are not directed packets, the communicator examines the SID field 48 of the LAN packet encapsulated in the incoming bridge packet and refers to the address table 90 to determine the address state 94 of the NID specified, as shown at 114. If the address state listed in the address table 90 for the NID is UNK or NPR, the communicator records in the address table 90 that the address state for this NID is RMT and records in the communicator address field of the address table 90 the CID of communicator from which the bridge packet was sent, as shown at 116. The communicator then queues the LAN packet for transmission on the local LAN segment 34 as shown at 118. Thereafter the communicator awaits the next bridge packet, as shown at 110.

On the other hand, if the NID specified in the SID field 48 of the incoming encapsulated LAN packet is determined at 114 to be an address state of ALI, LOC, or OWN, a further determination is made at 120. If the address state is ALI, as determined at 120, the CID of the address tuple recorded for this alias is compared to the CSID of the bridge packet 80 at 121. If the CID and CSID are equal, the existing alias (AID) from the address table will be obtained and substituted in the SID field 48 of the LAN packet as shown at 122. The communicator then queues the LAN packet 40 with the substituted AID in its SID field for transmission on the local LAN segment 30 as shown at 118. Thereafter the communicator awaits the next bridge packet, as shown a t 110.

If the CSID of the bridge packet does not match (any of) the address tuples recorded for this alias, as determined at 121, or if the address state of the SID in the LAN packet is OWN or LOC, as determined at 120, the communicator will generate an alias by searching the address table 90 for an NID whose address state is UNK or NPR as shown at 124. The address state for the selected NID is set to ALI and the CID of the source communicator sending the bridge packet is recorded, in the relevant fields of the address table 90 as shown at 126. The original NID from the SID field in the incoming LAN packet 40 is recorded in the alias address column 96 of the address table 90 as shown at 128. The newly-generated AID is then substituted in the SID field of the LAN packet 40 as shown at 122, followed by queuing the LAN packet 40 for transmission on the local LAN segment 30 at 118 and the return to await further bridge packets at 110.

If the address state is determined at 114 to be RMT, the communicator will determine whether this is a known RMT node by checking the CID information 98 already recorded in the address table 90 for this NID as shown at 130. If the RMT state reflects the correct source communicator, as established by the fact that the matching CID value has previously been recorded in the communicator address field 98 of this address table entry, the LAN packet 40 will be queued for transmission on the LAN segment as shown at 118, followed by the return to await for further bridge packets as shown at 110.

If the determination at 130 reveals an address state for the SID established at 114 is from a different remote LAN segment than that of CID stored in the communicator address field 98 of this address table entry, an alias must be generated. This condition occurs when two or more remote nodes are using the same NID and the second duplicated NID just became active on the bridged LAN segments. The alias address must be generated to allow the second of these remote nodes to be uniquely addressed as distinct from the other such remote node. This is accomplished by generating an alias for the second such NID, and associating this alias with the CID of the communicator on that remote LAN segment. The alias is generated by performing the steps 124, 126 and 128 as previously described. The alias is thereafter substituted in the SID field as shown at 122, and thereafter the LAN packet is queued for transmission as shown at 118. The communicator then awaits the reception of another bridge packet as shown at 110.

If the lapDATA packet is determined at 112 to be a directed packet, i.e., the DID is not equal to zero, the response of the communicator is determined by the address state 94 shown in the address table 90 for the NIDs specified in the DID field 46 and SID field 48 of the LAN packet encapsulated in the incoming bridge packet. If the address state for the NID specified in the DID field of the LAN packet is determined at 132 to be LOC, the communicator will commence one of the three routines shown beginning at 114. If the address state is not LOC, as determined at 132, the packet will be evaluated at 134 to determine if the address state of the NID specified in the DID field is OWN. If it is, the communicator will recognize the LAN packet for control processing purposes as shown at 136, and thereafter await reception of the next bridge packet as shown at 110. If the address state is not OWN, the communicator will determine at 138 whether the address state of the NID specified as the SID is UNK or NPR. If the address state is UNK or NPR, the NID will be recorded at 140 as having an address state of RMT, and the CID specified in the CSID field 86 will be recorded in the communicator address column 98 as shown at 140. The communicator will then await the next bridge packet as shown at 110. If the source address state is neither UNK nor NPR, as determined at 138, (i.e., the address state is known to be RMT or ALI), after the LAN packet has previously been determined at 132 not to be directed to a local node, the communicator ignores or discards the bridge packet and awaits the next bridge packet as shown at 110.

In summary, in response to the receipt of a bridge packet and depending on the address states and other information stored in the address table for the NIDs specified in the SID field 48 and the DID field 46 of the encapsulated LAN packet, the communicator either will relay the LAN packet for transmission on the local LAN segment without modifying the SID, will substitute an existing alias from the address table for the SID, will generate a new alias and substitute it for the original SID and then direct the LAN packet for transmission on the local LAN segment or will record the information contained in the packet concerning non-local (or remote) nodes and then ignore or discard the packet.

The functionality of the communicator with regard to LAN packets received from the local LAN segment is shown in FIGS. 8a. and 8b. For LAN packets received from the local LAN segment, the communicator responds according to the information contained in the packet-type field 44 of the LAN packet and according to the NID specified in the DID field 46 of the LAN packet.

Operation commences in this regard while awaiting the reception of LAN packets as shown at 150 in FIG. 8a. The communicator determines the type of LAN packet received at 152 by examining the information contained in the packet-type field 44 of the LAN packet. If the LAN packet is a lapENQ packet, the communicator evaluates the address state for the NID specified in the DID field 46, as shown at 154. If the DID address state is UNK, NPR or LOC, the communicator will discard the LAN packet as shown at 155 and thereafter await reception of the next local LAN packet as shown at 150. The communicator will not generate a lapACK packet to defend a NID for any address state which is UNK or NPR because the communicator will allow a local node to adopt such an NID. Similarly, if the address state in the address table 90 for the NID specified in the DID field 46 is LOC, the communicator will discard the packet because the local node whose LAN interface adopted that NID is expected to acknowledge this request with a lapACK field.

If the address state in the table address 90 for the NID specified in the DID field 46 is determined to be RMT, ALI or OWN, as determined at 156, the communicator generates and transmits a lapACK LAN packet on the local LAN segment as shown at 156, and then returns to await another LAN packet at 150. As a result, the communicator prevents an interface on the local LAN segment 30 from adopting the same NID as the NID of the communicator or of any node already known to be active on a remotely bridged LAN segment 30 or any alias already in use.

If the communicator receives from the local LAN segment a lapACK, lapRTS or lapCTS packet, as determined at 152, a further determination is made at 158 whether the address state for the specified SID field is UNK or NPR. If previously recorded as UNK or NPR, the communicator will record at 160 that the address state of the NID specified in the SID field 48 of those LAN packets is LOC. If the address state for the SID is previously recorded as LOC, RMT, ALI, or OWN, the step 160 is avoided. Thereafter, the next step at 162 is to specifically determine from the packet-type field information, whether the packet is a lapRTS, lapCTS or lapACK. For a lapRTS packet, as determined at 162, a further determination is made at 164 whether the DID address state is ALI, RMT or OWN. If so, a lapCTS packet will be generated at 166 to respond to the lapRTS packet. Thus the communicator will respond with a lapCTS when the DID is on another LAN segment (RMT or ALI) or directed to the communicator (OWN). The acknowledgement of the lapRTS packet with a lapCTS packet creates a "handshake" with the requesting local node to initiate the transmission of the lapDATA packet. The local communicator handles the subsequent lapDATA packet as described below. However, in order to be transparent to the locally-attached node, the communicator must generate the lapCTS packet so that the local node which generated the lapRTS will begin to transmit the lapDATA packet in response to the lapCTS packet. After generating the lapCTS, the communicator will return at 150 to await the reception of another local LAN packet.

If the determination at 164 is that the DID address state is not RMT, ALI, or OWN, the communicator will discard the lapRTS packet as shown at 167 and await reception of the next LAN packet as shown at 150. The communicator will discard the lapRTS packet because, if the address state for the specified DID is LOC, the local node will respond to the lapRTS statement. If the address state is NPR or UNK, there is no valid destination for the lapRTS packet, and the lapRTS packet should not be acknowledged. For these tests the address state of the broadcast DID (zero) is considered to be LOC, so no lapCTS is generated, since there are not supposed to be lapCTS responses to broadcast lapRTS packets.

Upon recognizing a lapCTS packet at 162, a determination is made at 168 whether the specified SID of the lapCTS packet is the same as the specified DID of a lapDATA packet which is waiting to be sent. For lapDATA packets received by the communicator encapsulated in a bridge packet, the communicator will generate a lapRTS packet to initiate the lapRTS/lapCTS handshaking between the communicator and the addressed node on the local LAN segment before transmitting the lapDATA packet on the local LAN segment. If the lapCTS packet is in response to such a lapRTS packet sent by the communicator, the lapDATA packet is sent as shown at 170. If the SID of the lapCTS packet is not the same as the DID of the lapDATA packet awaiting transmission, the communicator will discard the lapCTS packet as shown at 171. In either of the cases arising out of the determination made at 168, the communicator then returns to await for the receipt of another local LAN packet at 150.

Finally, if the determination at 162 indicates a lapACK packet, a further determination is made at 172 whether the lapACK is responsive to lapENQ packets generated in a probe operation by the communicator, or by an attempt by the communicator to allocate an NID for use as an alias. If so, and the NID specified in the SID field of the lapACK packet is the same as the DID specified by the lapENQ packets originated by the communicator, the communicator will choose another NID and begin the lapENQ/lapACK probe or alias generation operation again as shown at 174. If the NID specified in the SID field of the lapACK packet is not the same as the DID specified by the lapENQ packets originated by the communicator, the communicator will discard the lapACK packet as shown at 175 and the communicator awaits reception of the next LAN packet as shown at 150.

If the LAN packet received is determined at 152 to be a lapDATA packet, its DID field 46 is checked at 176 to determine whether it is a directed packet or a broadcast packet (FIG. 8b). If the NID specified in the DID field indicates it is a broadcast, the communicator will set the CID in the CDID field of the bridge packet to a broadcast code and then queue the bridge packet for transmission to the other bridged-together communicators via the RF network as shown at 178. The communicator will then return to await reception of the next LAN packet as shown at 150.

If the DID field indicates that the lapDATA packet is a directed packet, as determined at 176, the address state of the DID of the directed lapDATA packet is then evaluated as shown at 180 to determine if the address state is ALI, OWN or RMT. If not, the LAN packet is discarded as shown at 181, and the communicator will then return to await reception of the next LAN packet as shown at 150. If the address state is determined to be ALI, OWN or RMT, however, a further determination is made as shown at 182 to determine the particular address state. If the address state is OWN, the lapDATA packet must contain information relating to the communicator itself, and the communicator will store the packet for control processing as shown at 183 and await reception of the next LAN packet as shown at 150. If the address state for the specified DID is ALI, as determined at 180, the actual address will be substituted for the AID in the DID field of the directed lapDATA packet as shown at 184. The CID for the communicator with which the remote actually addressed node is associated is retrieved from the address table as shown at 186, and the bridge packet is assembled and queued for transmission as shown at 188. If the address state is determined at 180 to be RMT, the NID need not be aliased. The CID for the communicator with which the remote addressed node is associated is obtained from the table as shown at 186, and the bridge packet is assembled for transmission to the remote communicator as shown at 188. After the bridge packet is assembled and queued for transmission at 188, the communicator will then await reception of the next LAN packet as shown at 150.

As is apparent from the previous description, the present invention obtains significant improvements in bridging LAN segments to achieve transparent, reliable and unambiguous communications between nodes of the bridged LAN segments, even when there are duplications or replications of the NIDs on the LAN segments. The present invention is of particular advantage for bridging LAN segments to implement a wireless LAN, where some of the nodes are portable computers which can move into and out of communication areas due to the mobility of the users of the portable computers.

While the present invention is capable of being applied at any of several layers of network functionality, as defined by the International Standards Organization (ISO) 7-layer reference model, the greatest advantage obtains with the application is when the bridging occurs at the media access control (MAC) sub-layer of the link layer, as is illustrated in the preferred embodiment. Below the MAC sub-layer is the physical layer, at which bridging is a meaningless concept, since all entities attached to the same physical layer are, by definition, on a common network segment. Above the MAC sub-layer, especially above the link layer entirely, bridging functions are more commonly subsumed into entities called routers, that perform more processing on the packets, and which may apply other criteria, such as transmission cost, path failure recovery and the like, into the routing decision. Routers are inherently more complex, and are generally more expensive than bridges to achieve the same (or greater) functionality. While bridges are commonly used at the MAC sub-layer, conventional bridging algorithms are incapable of dealing with NIDs that are not globally unique. For example both of the bridging techniques specified by IEEE standard 802, spanning tree bridging and source routed bridging, rely on the existence of globally-unique, statically allocated, 48-bit NIDs to direct packet traffic between network segments. If NIDs were to be duplicated, or were to change dynamically while the network was in operation (even if the changed NID was unique), these bridging algorithms would fail.

Presently preferred embodiments of the present invention and many of its improvements have been described with a degree of particularity. The previous description is of the preferred example for implementing the invention, but the scope of the invention should not necessarily be limited by this description. The scope of the present invention is defined by following claims.

The invention claimed is:

1. Bridging apparatus for communicating LAN packets between at least two separate LAN segments in which at least one node of a local LAN segment has a duplicate identification (ID) of a node of at least one other remote LAN segment, comprising:

LAN interface means adapted to be connected to each LAN segment and operative for communicating LAN packets with the nodes of the connected LAN segment using a LAN protocol, the LAN protocol prohibiting nodes with the same ID only on each LAN segment, the LAN protocol further requiring a source ID (SID) and a destination ID (DID) to be included in each LAN packet to identify a source node sending the LAN packet and a destination node receiving the LAN packet respectively, each LAN packet being one of either a locally destined LAN packet sent by a source node on a local LAN segment and destined for a destination node on the same local LAN segment or a remotely destined LAN packet sent by a source node on one LAN segment and destined for a destination node on a different and remote LAN segment; and interoperative bridging means operatively connected to and controlling the LAN interface means, the interoperative bridging means functioning in response to a remotely destined LAN packet to communicate the remotely destined LAN packet to the remote LAN segment, the interoperative bridging means further including aliasing means;

the aliasing means responding to the SID of a remotely destined LAN packet received from one LAN segment and determining if the SID is a duplicate of an ID in use on the other LAN segment and if so substituting for the SID an unused ID on the other LAN segment as an alias ID (AID) before sending the LAN packet with the AID as the SID on the other LAN segment, and the aliasing means communicating LAN packets by use of the AID between the nodes having the duplicate IDs on the LAN segments without changing the LAN protocol.

2. Bridging apparatus as defined in claim 1 wherein:
the interoperative bridging means includes a control means which directly connects to and controls the operation of the LAN interface means and the aliasing means.

3. Bridging apparatus as defined in claim 1 wherein:
one LAN interface means is connected to each LAN segment;
the interoperative bridging means includes a communicator means associated with each LAN segment, the communicator means including the LAN interface means connected to each LAN segment, each communicator means including a transmitter and receiver means and a control means connected to and operatively controlling the LAN interface means and the transmitter and receiver means of each communicator means, the communicator means also including the aliasing means; and
the remotely destined LAN packets are communicated between the LAN segments by transmitting and receiving the remotely destined LAN packets in signals between the transmitter and receiver means of the communicator means associated with each LAN segment.

4. Bridging apparatus as defined in claim 3 wherein:
the signals transmitted and received are wirelessly transmitted signals.

5. Bridging apparatus as defined in claim 4 wherein:
the signals transmitted and received are radio frequency signals.

6. Bridging apparatus as defined in claim 2 wherein:
the control means determines information describing each ID in use on each local LAN segment and describing each ID in use on each remote LAN segment, and the aliasing means utilizes the ID in use information to substitute the AID as the SID.

7. Bridging apparatus as defined in claim 6 wherein:
the ID used as the AID for the duplicated ID on one LAN segment is different than the ID used as the AID for the duplicated ID on the other LAN segment.

8. Bridging apparatus as defined in claim 6 wherein:
the ID of each node is dynamically assigned on each LAN segment upon a node becoming operative on the LAN segment.

9. Bridging apparatus as defined in claim 8 wherein:
the dynamic assignment of each node ID occurs in accordance with the LAN protocol and involves sending an inquiry to an ID of the local LAN segment and thereafter assuming the ID to which the inquiry was sent if a response to that inquiry was not received; and
the control means sends a response to each inquiry on a local LAN segment which has a DID that is the same as the ID in use on another LAN segment.

10. Bridging apparatus as defined in claim 6 wherein:
the control means determines the ID in use information by causing the LAN interface means to send an inquiry to each ID of each LAN segment to obtain the ID in use information relating to the each ID which is in use on each LAN segment.

11. Bridging apparatus as defined in claim 10 wherein:
the control means further operatively establishes a time entry associated with the ID in use information for each ID in use, the time entry relating to the time when the ID in use information relating to that ID was last updated; and
the control means periodically updates the ID in use information associated with each node after the expiration of a predetermined time after the time entry.

12. Bridging apparatus as defined in claim 3, wherein:
the separate LAN segments for a Group;
each communicator means further including communicator interface means for transmitting and receiving bridge packets, each communicator interface means having a unique communicator ID (CID) which identifies and distinguishes it from every other communicator interface means in the Group; and
the control means operatively connects to and controls the communicator interface means of each communicator means;
the control means is operative in response to the receipt from the LAN interface means of a remotely destined LAN packet sent by a source node on the local LAN segment to which the LAN interface means is connected, to encapsulate the remotely destined LAN packet into a bridge packet and to control the communicator interface means to transmit the bridge packet for receipt by the communicator interface means associated with the remote LAN segment which includes the destination node to which the encapsulated LAN packet is destined;

the control means inserting a communicator source ID (CSID) and a communicator destination ID (CDID) in each bridge packet to identify the source communicator interface mans transmitting the bridge packet and the destination communicator means receiving the bridge packet, respectively;

the control means determining the CDID of the communicator interface means associated with the LAN segment which includes the destination node to which the encapsulated LAN packet is destined;

the control means is further operative in response to a bridge packet which has its CID as the CDID to extract the LAN packet from the received bridge packet and to control the LAN interface means to which the control means is connected to send the extracted LAN packet to the local LAN segment which includes the destination node to which the extracted LAN packet is destined.

13. Bridging apparatus as defined in claim 12 wherein:

the CDID of the bridge packet and the DID of the LAN packet form a tuple which uniquely identifies each node in the Group without regard to the duplicate IDs on the separate LAN segments.

14. Bridging apparatus as defined in claim 13 wherein:

the control means determines information describing each ID in use on each local LAN segment and describing each ID in use on each remote LAN segment;

the aliasing means utilizes the ID in use information to substitute the AID as the SID;

the control means further periodically updates the ID in use information on each LAN segment to determine the possible transfer of an ID in use from one LAN segment to another LAN segment.

15. Bridging apparatus as defined in claim 14 wherein:

the control means further operatively establishes a time entry associated with each item of ID in use information which describes the time that the item of ID in use information was last updated; and the control means eliminates, downgrades, or reconfirms each item of ID in use information after the expiration of a predetermined time after the time entry was established.

16. Bridging apparatus as defined in claim 12 wherein:

the control means determines if the DID of a remotely destined LAN packet sent by a source node on the local LAN segment is connected is an AID and if so substitutes for the AID the ID of the remote node which correlates to the AID before the LAN packet is encapsulated and sent as a bridge packet.

17. Bridging apparatus as defined in claim 12 wherein:

the AID substituted for the duplicate ID by the aliasing means associated with one LAN segment is different than the AID substituted by the aliasing means associated with the other LAN segment.

18. Bridging apparatus as defined in claim 12 wherein:

the control means determines information describing the ID in use on the local LAN segment, describing the ID in use on each remote LAN segment, describing each CDID with which each ID in use on a remote LAN segment is associated and correlating each AID with its corresponding ID in use on a remote LAN segment and its associated CDID; and the control means utilizes the information and the correlation to substitute the AID as the SID in each remotely destined LAN packet sent to a node with a duplicate ID.

19. Bridging apparatus as defined in claim 18 wherein:

the ID of each node of each LAN segment is dynamically assigned upon a node becoming active on the LAN segment; and the dynamic assignment of each node ID occurs in accordance with the LAN protocol and involves sending an inquiry to an ID of the associated LAN segment and thereafter assuming the ID to which the inquiry was sent if a response to that inquiry was not received; and the control means sends a response on the local LAN segment to inquiries from local nodes to nodes with DIDs that are in use on remote LAN segments.

20. Bridging apparatus as defined in claim 19 wherein:

the control means further operatively causes its associated LAN interface means to send an inquiry to each ID of the local LAN segment to determine information relating to the nodes which are in use on the local LAN segment.

21. A bridging method for communicating LAN packets between at least two separate LAN segments in which at least one node of a local LAN segment has a duplicate identification (ID) of a node of at least one other remote LAN segment, comprising the steps of:

connecting a LAN interface to each LAN segment;

communicating LAN packets with the nodes of the connected LAN segment using the connected LAN interface operating in accordance with a LAN protocol;

prohibiting nodes with the same ID only on each LAN segment in accordance with the LAN protocol;

including a source ID (SID) and a destination ID (DID) in each LAN packet to identify a source node sending the LAN packet and a destination node receiving the LAN packet respectively, in accordance with the LAN protocol;

designating each LAN packet as one of either a locally destined LAN packet sent by a source node on a local LAN segment and destined for a destination node on the same local LAN segment or a remotely destined LAN packet by a source node on one LAN segment and destined for a destination node on a different and remote LAN segment; and communicating a remotely destined LAN packet from a local LAN segment to a remote LAN segment by steps including:

determining if the SID of the remotely destined LAN packet received form one LAN segment is a duplicate of an ID in use on the other LAN segment, and if so substituting for the SID an unused ID on the other LAN segment as an alias ID (AID) for the SID of the remotely destined LAN packet before communicating the LAN packet with the AID as the SID to the other LAN segment, and communicating LAN packets by use of the AID between the nodes having the duplicate IDs on the LAN segments without changing the LAN protocol.

22. A bridging method as defined in claim 21 further comprising the steps of:

connecting one LAN interface means to each LAN segment;

connecting a communicator with each LAN segment, the communicator including the LAN interface connected to each LAN segment, communicating the remotely destined LAN packets between the LAN segments by transmitting and receiving the remotely destined LAN packets between the communicators associated with each LAN segment.

23. A bridging method as defined in claim 22 further comprising the step of:

wirelessly transmitting and receiving the LAN packets.

24. A bridging method as defined in claim 23 further comprising the step of:

transmitting and receiving radio frequency signals to communicate the remotely destined LAN packets.

25. A bridging method as defined in claim 22 wherein:

determining information describing each ID in use on each local LAN segment;

determining information describing each ID in use on each remote LAN segment; and utilizing the ID in use information to substitute the AID as the SID.

26. A bridging method as defined in claim 25 further comprising the step of:

using an ID as the AID for the duplicated ID on one LAN segment which is different than the ID used as the AID for the duplicated ID on the other LAN segment.

27. A bridging method as defined in claim 26 further comprising the step of:

dynamically assigning the ID of each node on each LAN segment upon a nod becoming operative on the LAN segment.

28. A bridging method as defined in claim 27 further comprising the steps of:

dynamically assigning each node ID in accordance with the LAN protocol by sending an inquiry to an ID of the local LAN segment and thereafter assuring the ID to which the inquiry was sent if a response to that inquiry was not received; and sending a response from the communicator to each inquiry on a local LAN segment which has a DID that is the same as the ID in use on another LAN segment.

29. A bridging method as defined in claim 25 wherein the step of determining the ID in use information further comprises the step of:

sending an inquiry to each ID of each LAN segment to obtain the ID in use information relating to the IDs which are in use on each LAN segment.

30. A bridging method as defined in claim 29 further comprising the steps of:

establishing a time entry associated with the ID in use information for each ID in use, the time entry describing the time when the ID in use information relating to that ID was last updated; and periodically updating the ID in use information associated with each ID in use after the expiration of a predetermined time after the time entry.

31. A bridging method as defined in claim 22, further comprising the steps of:

forming a group from a plurality of the separate LAN segments;

transmitting and receiving bridge packets between communicators;

assigning a unique communicator ID (CID) to each communicator which identifies and distinguishes it from every other communicator in the Group; and encapsulating the remotely destined LAN packet into a bridge packet in response to the receipt by one communicator of a remotely destined LAN packet sent by a source node on the local LAN segment to which the one communicator is connected;

communicating the bridge packet to the communicator connected to the remote LAN segment which includes the destination node to which the encapsulated LAN packet is destined;

inserting a communicator source ID (CSID) and a communicator destination ID (CDID) in each bridge packet to identify the source communicator transmitting the bridge packet and the destination communicator receiving the bridge packet, respectfully;

determining the CDID of the communicator associated with the LAN segment which includes the destination node to which the encapsulated LAN packet is destined;

extracting the LAN packet from the received bridge packet in response to the receipt by a communicator of a bridge packet which has its CID as the CDID of the bridge packet; and sending the extracted LAN packet to the local LAN segment which includes the destination node to which the extracted LAN packet is destined.

32. A bridging method as defined in claim 31 further comprising the step of:

forming a tuple which uniquely identifies each node in the Group without regard to the duplicate IDs on the separate LAN segments from the CDID of the bridge packet and the DID of the LAN packet.

33. A bridging method as defined in claim 32 further comprising the steps of:

determining information describing each ID in use on each local LAN segment;

determining information describing each ID in use on each remote LAN segment;

utilizing the ID in use information to substitute the AID as the SID;

periodically updating the ID in use information on each LAN segment to determine the possible transfer of an ID in use from on LAN segment to another LAN segment.

34. A bridging method as defined in claim 33 further comprising the steps of:

establishing a time entry associated with each item of ID in use information which describes the time that the item of ID in use information was last updated; and one of eliminating, downgrading, or reconfirming each item of ID in use information after the expiration of a predetermined time after the time entry was established.

35. A bridging method as defined in claim 31 further comprising the steps of:

determines if the DID of a remotely destined LAN packet sent by a source node on the local LAN segment is connected is an AID; and if so substituting for the AID the ID of the remote node which correlates to the AID before the LAN packet is encapsulated and sent as a bridge packet.

36. A bridging method as defined in claim 31 further comprising the step of:

substituting an AID for the duplicate ID in LAN packets communicated on one LAN segment which is different than the AID substituted in LAN packets communicated on the other LAN segment.

37. A bridging method as defined in claim 31 further comprising the steps of:

determining information describing each ID in use on each local LAN segment;

determining information describing each ID in use on each remote LAN segment;

determining information describing each CDID with which each ID in use on a remote LAN segment is associated;

correlating each AID with its corresponding ID in use on a remote LAN segment and its associated CDID; and the control means utilizes the information and the correlation to substituting the AID as the SID in each remotely destined LAN packet sent to a node with a duplicate ID by using the correlation of determined information.

38. A bridging method as defined in claim 37 further comprising the steps of:

dynamically assigning the ID of each node of each LAN segment upon a node becoming active on the LAN segment; and dynamically assigning each node ID in accordance with the LAN protocol by sending an inquiry to an ID of the local LAN segment and thereafter assuming the ID to which the inquiry was sent if a response to that inquiry was not received; and sending a response from the communicator to each inquiry on a local LAN segment which has a DID that is the same as the ID in use on another LAN segment.

* * * * *